(12) United States Patent
Tymchenko

(10) Patent No.: US 12,513,185 B2
(45) Date of Patent: *Dec. 30, 2025

(54) DETECTING VISUAL SIMILARITY BETWEEN DNS FULLY QUALIFIED DOMAIN NAMES

(71) Applicant: Infoblox Inc., Santa Clara, CA (US)

(72) Inventor: Vadym Tymchenko, Issaquah, WA (US)

(73) Assignee: Infoblox Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/680,878

(22) Filed: May 31, 2024

(65) Prior Publication Data

US 2024/0323223 A1  Sep. 26, 2024

Related U.S. Application Data

(63) Continuation of application No. 17/489,117, filed on Sep. 29, 2021, now Pat. No. 12,041,076.

(51) Int. Cl.
| | | |
|---|---|---|
| *G06F 21/00* | (2013.01) | |
| *H04L 9/40* | (2022.01) | |
| *H04L 61/4511* | (2022.01) | |

(52) U.S. Cl.
CPC ........ *H04L 63/145* (2013.01); *H04L 61/4511* (2022.05); *H04L 63/0236* (2013.01); *H04L 63/0263* (2013.01); *H04L 63/101* (2013.01)

(58) Field of Classification Search
CPC .............. H04L 63/145; H04L 61/4511; H04L 63/0236; H04L 63/0263; H04L 63/101; H04L 2101/32
See application file for complete search history.

(56) References Cited

U.S. PATENT DOCUMENTS

| 8,578,481 B2 | 11/2013 | Rowley |
| 9,118,704 B2 | 8/2015 | Miller |
| 9,218,482 B2 | 12/2015 | Ma |
| 9,516,058 B2 | 12/2016 | Antonakakis |

(Continued)

FOREIGN PATENT DOCUMENTS

WO  WO-2019228613 A1 * 12/2019  ........... G06N 3/0445

OTHER PUBLICATIONS

APWG, Phishing Activity Trends Report, 2nd Quarter 2021, Sep. 22, 2021, pp. 1-12.

(Continued)

*Primary Examiner* — Michael M Lee
(74) *Attorney, Agent, or Firm* — Van Pelt, Yi & James LLP

(57) ABSTRACT

Various techniques for detecting visual similarity between DNS fully qualified domain names (FQDNs) are disclosed. In some embodiments, a system, process, and/or computer program product for detecting visual similarity between DNS FQDNs includes receiving a DNS data stream, wherein the DNS data stream includes a DNS query and a DNS response for resolution of the DNS query; performing extended sequence alignment for each of the set of FQDNs to identify potential malware FQDNs for one or more target FQDNs based on a visual similarity for each domain in the DNS data stream; and classifying the set of domains as malware FQDNs or benign FQDNs based on results of the extended sequence alignment.

17 Claims, 24 Drawing Sheets

(56) References Cited

U.S. PATENT DOCUMENTS

| | | |
|---|---|---|
| 9,621,566 B2 | 4/2017 | Gupta |
| 9,674,213 B2 | 6/2017 | Oberheide |
| 9,762,612 B1 | 9/2017 | Schiffman |
| 9,979,748 B2 | 5/2018 | O'Connor |
| 10,097,580 B2 | 10/2018 | Aharon |
| 10,498,761 B2 | 12/2019 | Wright |
| 2006/0107321 A1 | 5/2006 | Tzadikario |
| 2017/0041333 A1 | 2/2017 | Mahjoub |
| 2018/0139235 A1 | 5/2018 | Desai |
| 2018/0145993 A1* | 5/2018 | Akiyama ............ H04L 63/101 |
| 2018/0337947 A1 | 11/2018 | Schiffman |
| 2019/0387024 A1 | 12/2019 | Schulman |
| 2020/0228500 A1 | 7/2020 | Olumofin |
| 2022/0070194 A1 | 3/2022 | Pon |

OTHER PUBLICATIONS

Neculoiu et al., Learning Text Similarity with Siamese Recurrent Networks, The 54th Annual Meeting of the Association for Computational Linguistics, Aug. 11, 2016, pp. 148-157.

Renee Burton, Characterizing Certain DNS DDoS Attacks, Jul. 23, 2019, pp. 1-25.

Renee Burton, Unsupervised Learning Techniques for Malware Characterization, Understanding Certain DNS-based DDos Attacks, Aug. 2018, pp. 111:1-111:27.

Security Magazine, DOJ Announces Disruption of Hundreds of Online COVID-19 Related Scams, Apr. 24, 2020.

Wikipedia, Sequence Alignment, Sep. 27, 2021, pp. 1-18.

* cited by examiner

Report Example: modified SLL name, combosquatting

SOA MNAME: ns1.markmonitor.com
SOA RNAME: hostmaster.markmonitor.com

SOA MNAME: ppns1.pnx.paypal.com
SOA RNAME: hostmaster.paypal.com

Description: exact match of the monitored domain SLL appended some word found in domain name part of the FQDN SOA MNAME: ph-tld-ns.dot.ph.
SOA RNAME: sysadmin.domains.ph.

SOA MNAME: ns10.bac.com.
SOA RNAME: domain\.administrator.
bankofamerica.com.

Description: exact match of the monitored domain SLL, appended with some word found in domain name part of the FQDN.

Report Examples: embedding SLL

SOA MNAME: ns1.sedoparking.com
SOA RNAME: hostmaster.sedo.de

SOA MNAME: ppns1.pnx.paypal.com
SOA RNAME: hostmaster.paypal.com

Description: exact match of the monitored domain SLL found in hostname part of the FQDN SOA MNAME: ns3.afternic.com
SOA RNAME: dns.jomax.net

SOA MNAME: ppns1.pnx.paypal.com
SOA RNAME: hostmaster.paypal.com

Description: exact match of the monitored domain SLL found in hostname part of the FQDN

Report Examples: combo squatting, embedding SLL, homographs

SOA MNAME: ns-1354.awsdns-41.org.
SOA RNAME: awsdns-hostmaster.amazon.com.

SOA MNAME: a.ns.facebook.com.
SOA RNAME: dns.facebook.com.

Description: homograph-modified match of the monitored domain SLL, prefixed with different word found in hostname part of the FQDN.

FIG. 1E

Example of DNS-enriched Aggregated Targets

| sll | tld | pfx | soa_mname | soa_rname |
|---|---|---|---|---|
| bankofamerica | (com,) | (,) | ns10.bac.com. | domain\administrator.bankofamerica.com. |
| facebook | (hu, it, dik, pl, co, cn, fi, com.ar, design, f... | (,) | a.ns.facebook.com. | dns.facebook.com. |
| google | (co.ma, com.kh, com.my, bg, com.nf, td, co.ck,... | (, tagmanager, assistant, scholar, translate, ... | ns1.google.com. | dns-admin.google.com. |
| microsoft | (us, net, com) | (,) | ns1-205.azure-dns.com. | azuredns-hostmaster.microsoft.com. |
| paypal | (ca, com.mx, com.my, com, se, es, no, com.sg, ... | (,) | ppns1.phx.paypal.com. | hostmaster.paypal.com. |
| twitter | | (mobile,) | ns1.p26.dynect.net. | zone-admin.dyndns.com. |
| yahoo | (if, it, com, at, hu, es, nl) | (finance,) | ns1.yahoo.com. | hostmaster.yahoo-inc.com. |

FIG. 1F

Legend:

sll - second level label (SLL)
tld - top level domains (TLD) associated with initially requested targets
pfx - list of initially requested prefixes (hostnames) associated with the target
soa_mname - the common SOA MNAME record of target domains (Primary DNS reference)
soa_mame - the common SOA RNAME record of target domains (Administrative email)

"apple.com": 1906, "android.com": 1889, "gmail.com": 1376, "cisco.com": 1345,
"linkedin.com": 1320, "google.com": 990, "amazon.com": 964, "facebook.com": 933,
"chase.com": 924, "blogger.com": 901, "outlook.com": 899, "youtube.com": 807,
"yahoo.com": 730, "salesforce.com": 723, "sharepoint.com": 710, "twitch.tv": 708,
"office365.com": 671, "intel.com": 657, "tumblr.com": 607,

FIG. 3

Given

*candidate* - candidate string that needs to be compared to target, i.e. g00gle

*target* - the target string that the candidate is compared to

*operations* - a set of supported operations {NOOP, MATCH, MISMATCH, INSERT, DELETE, PREFIX, SUFFIX, HOMOGRAPH, COMPOSITE1, COMPOSITE2, SWAP, DUPLICATE}, in this implementation example all operations are enumerable, i.e. NOOP=0, MATCH=1, ..., DUPLICATE=11

*costs* - pre-defined set of costs associated with operations. In this implementation provided as a vector where the cost is at the position associated with the operation index. In this example we use negative costs (penalties) for each operation.

*Example of Operations Ordering*
Operations = {
NOOP = 0, MATCH = 1, MISMATCH = 2, HOMOGRAPH = 3, SUFFIX = 4, INSERT = 5,
DELETE = 6, DUPLICATE = 7, SWAP = 8, COMPOSITE1 = 9, COMPOSITE2 = 10, PREFIX = 11
}

*And associated costs:*
costs = [0, 0, -9, -4, -3, -8, -8, -4, -4, -4, -4, -3, -7, -7, -7, -3]

Initialization

Prepend candidate and target with start characters
    cnd = '^' + candidate
    tgt = '^' + target Create cost matrix F and operation matrix D
of sizes (length(cnd) + 1) x (length(tgt) + 1)

Initialize edge cases
    $F[0,0] = F[0,1] = F[1,0] = F[1,1]$ = costs[NOOP]
    $F[0,j]$ = 2 * min(costs) * j     for j in 1..length(tgt)
    $F[1,j]$ = -costs[DELETE] * j     for j in 1..length(tgt)
    $F[i,0]$ = 2 * min(costs) * i     for i in 1..length(cnd)
    $F[i,1]$ = -costs[PREFIX] * i     for i in 1..length(cnd)

$D[0,0] = D[0,1] = D[1,0] = D[1,1]$ = NOOP
    $D[0,j]$ = NOOP     for j in 1..length(tgt)
    $D[1,j]$ = DELETE     for j in 1..length(tgt)
    $D[i,0]$ = NOOP     for i in 1..length(cnd)
    $D[i,1]$ = PREFIX     for i in 1..length(cnd)

|   | ^ | g | o | o | g | l | e |
|---|---|---|---|---|---|---|---|
| ^ | 0 | 0 | -10 | -20 | -30 | -40 | -50 | -60 |
| g | 0 | 0 | -2 | -4 | -6 | -8 | -10 | -12 |
| 0 | -10 | -3 | | Costs matrix F | | | |
| 0 | -20 | -6 | | in this example | | | |
| g | -30 | -9 | | max(costs) = 10 | | | |
| l | -50 | -12 | | costs[PREFIX] = 2 | | | |
| e | -60 | -15 | | costs[DELETE] = 3 | | | |

|   | ^ | g | o | o | g | l | e |
|---|---|---|---|---|---|---|---|
| ^ | N | N | N | N | N | N | N |
| g | N | N | D | D | D | D | D |
| 0 | N | P | | Operations matrix D | | | |
| 0 | N | P | | in this example | | | |
| g | N | P | | N = NOOP | | | |
| l | N | P | | P = PREFIX | | | |
| e | N | P | | D = DELETE | | | |

FIG. 6A

Forward Path (Tabular Processing)
Fill the cost matrix F and operations matrix D:

*for i in 2..length(cnd)*
    *for j in 2..length(tgt)*
        *cnd' = cnd[i-2..i]*
        *tgt' = tgt[j-2 .. j]*
        *F' = F[i-2.. i, j-2..j]*
        *is_tgt_end = bool(j == length(tgt))*

*op, cost = compute_operation_cost(F', cnd', tgt', is_tgt_end)*

*D[i,j] = op*
        *F[i,j] = cost*

*compute_operation_cost(F', cnd', tgt', Is_tgt_end)*
    is an implementation of general recursion at some position i, j.
arguments:
    *F'*- a submatrix of cost matrix F, size 3x3 where F'[2,2] corresponds to position F[i,j]
    *cnd'* - a substring of cnd, length 2, position cnd'[1] corresponds to cnd[i]
    *tgt'*- a substring of tgt, length 2, position tgt' [1] corresponds to tgt[j]
    *is_tgt_end* - a boolean indicator is true if j reached end of tgt
returns:
    *op* - the optimal operation
    *cost* - the cost associated with optimal operation Create a cost vector d with matching to the number of operations.
Initialize all elements with value -max(costs)

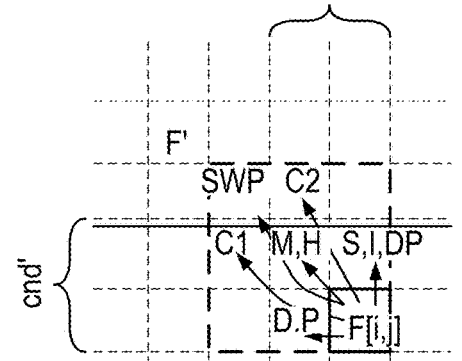

Legend: SWP-SWAP, C2 - COMPOSITE2, C1-COMPOSITE1, M-MATCH//MISMATCH, H-HOMOGRAPH, S - SUFFIX, I - INSERT, DP- DUPLICATE, D - DELETE, P - PREFIX fill the vector values

| | | |
|---|---|---|
| d[MATCH] | = F'[1,1] + costs[MATCH] | if cnd'[1] == tgt'[1] |
| d[MISMATCH] | = F'[1,1] + costs[MISMATCH] | if cnd'[1] == tgt'[1] |
| d[INSERT] | = F'[1,2] + costs[INSERT] | if not is_tgt_end |
| d[SUFFIX] | = F'[1,2] + costs[SUFFIX] | if is_tgt_end |
| d[DELETE] | = F'[2,1] + costs[DELETE] | |
| d[HOMOGRAPH] | = F'[1,1] + costs[HOMOGRAPH] | if is_homograph(cnd'[1], tgt'[1]) |
| d[COMPOSITE1] | = F'[0,1] + costs [COMPOSITE1] | if is_composite(cnd'[0], cnd'[1],tgt'[1]) |
| d[COMPOSITE2] | = F'[1,0] + costs [COMPOSITE2] | if is_composite(tgt'[0], tgt'[1], cnd'[1]) |
| d[SWAP] | = F'[0,0] + costs[SWAP] | if tgt'[0] == cnd'[1] and tgt'[1] == cnd'[0]) |
| d[DUPLICATE] | = F'[1,2] + costs[DUPLICATE] | if cnd'[0] == cnd'[1] and tgt'[1] == cnd'[1]) | return optimal operation and associated cost value:
    *op = argmax(d)*
    *cost = d[op]*

Helper functions
*Is_homograph(chr1, chr2)*
    returns True if provided two characters are mutual homographs. May be IDN extended
*Is_composite(chr1, chr2, chr3)*
    returns True if two characters (chr1 and chr2) are composite homograph of chr3

FIG. 6B

Traceback

The traceback function uses pre-computed table - reverse offsets for every operation. The tuple associated with each operation contains delta i and delta j - offsets to the next positions
Example:
ops_offsets = {
    NOOP = (0, 0),            MATCH = (-1, -1), MISMATCH = (-1, -1),
    HOMOGRAPH = (-1, -1), SUFFIX = (-1, 0), INSERT = (-1, 0),
    DELETE = (0, -1),       DUPLICATE = (-1, 0), SWAP = (-2, -2),
    COMPOSITE1 = (-2, -1), COMPOSITE2 = (-1, -2), PREFIX = (-1, 0),
} alignment_traceback(candidate, target, f, d)

This function returns mutually aligned strings candidate and target, where missing characters are replaced with '_' and a sequence of alignment operations optimal with respect to the costs provided to forward alignment function.

arguments:
    *candidate* - the candidate string
    *target* - the target string
    *F*- the cost matrix constructed by the forward path
    *D*- the operations matrix constructed by the forward path returns
    prefix - prefix component of the candidate string if any
    match - matching part of the candidate string, aligned to target with '_' expansion
    suffix - suffix component of the candidate string if any
    target' - the aligned target string, expanded with '_' where necessary
    trace - alignment operations trace Implementation of this function traces back through the cost matrix, and recovers the operation. Then it collects statistics, and builds match results along with target' which is adjusted by insertion of _where necessary (composite homographs and insert/delete operations).

FIG. 6C

DETECTING VISUAL SIMILARITY BETWEEN DNS FULLY QUALIFIED DOMAIN NAMES

CROSS REFERENCE TO OTHER APPLICATIONS

This application is a continuation of U.S. patent application Ser. No. 17/489,117, entitled DETECTING VISUAL SIMILARITY BETWEEN DNS FULLY QUALIFIED DOMAIN NAMES filed Sep. 29, 2021 which is incorporated herein by reference for all purposes.

BACKGROUND OF THE INVENTION

Network security is an increasingly challenging technical problem to protect networks and users accessing resources via networks, such as the Internet. The use of fake or misleading domain names is a frequently employed mechanism by malware, phishing attacks, online brand attacks, and/or for other nefarious activities that often attempt to trick users into visiting/accessing a site/service associated with the fake or misleading domain name.

BRIEF DESCRIPTION OF THE DRA WINGS

Various embodiments of the invention are disclosed in the following detailed description and the accompanying drawings.

FIGS. 2A-K illustrate examples of the Forward Path processing in accordance with some embodiments.

FIG. 3 illustrates examples of various lookalike domains that can be detected using the disclosed techniques in accordance with some embodiments.

Figure 4:
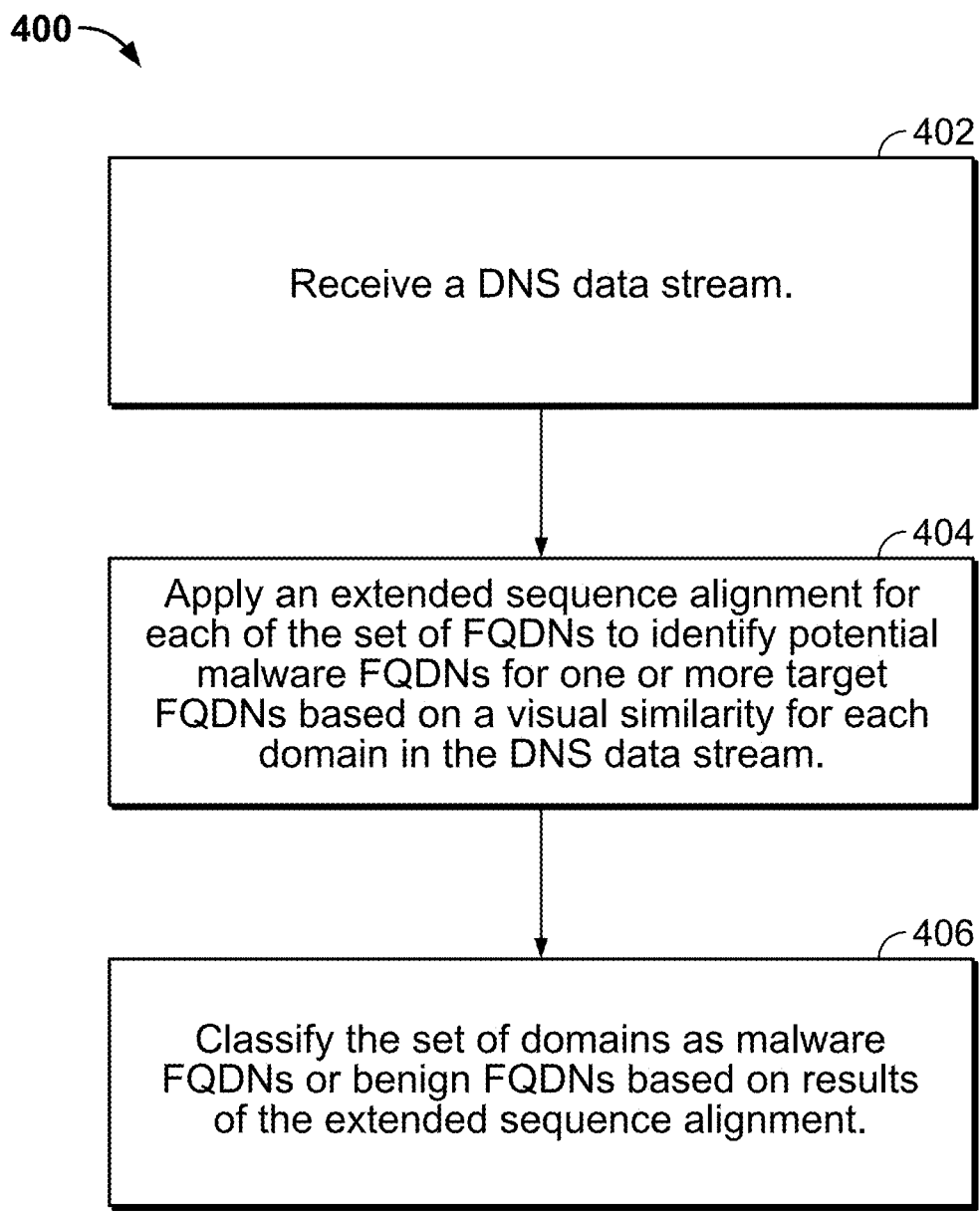

FIG. 4 is a flow diagram illustrating a process for detecting visual similarity between DNS FQDNs in accordance with some embodiments.

Figure 5:
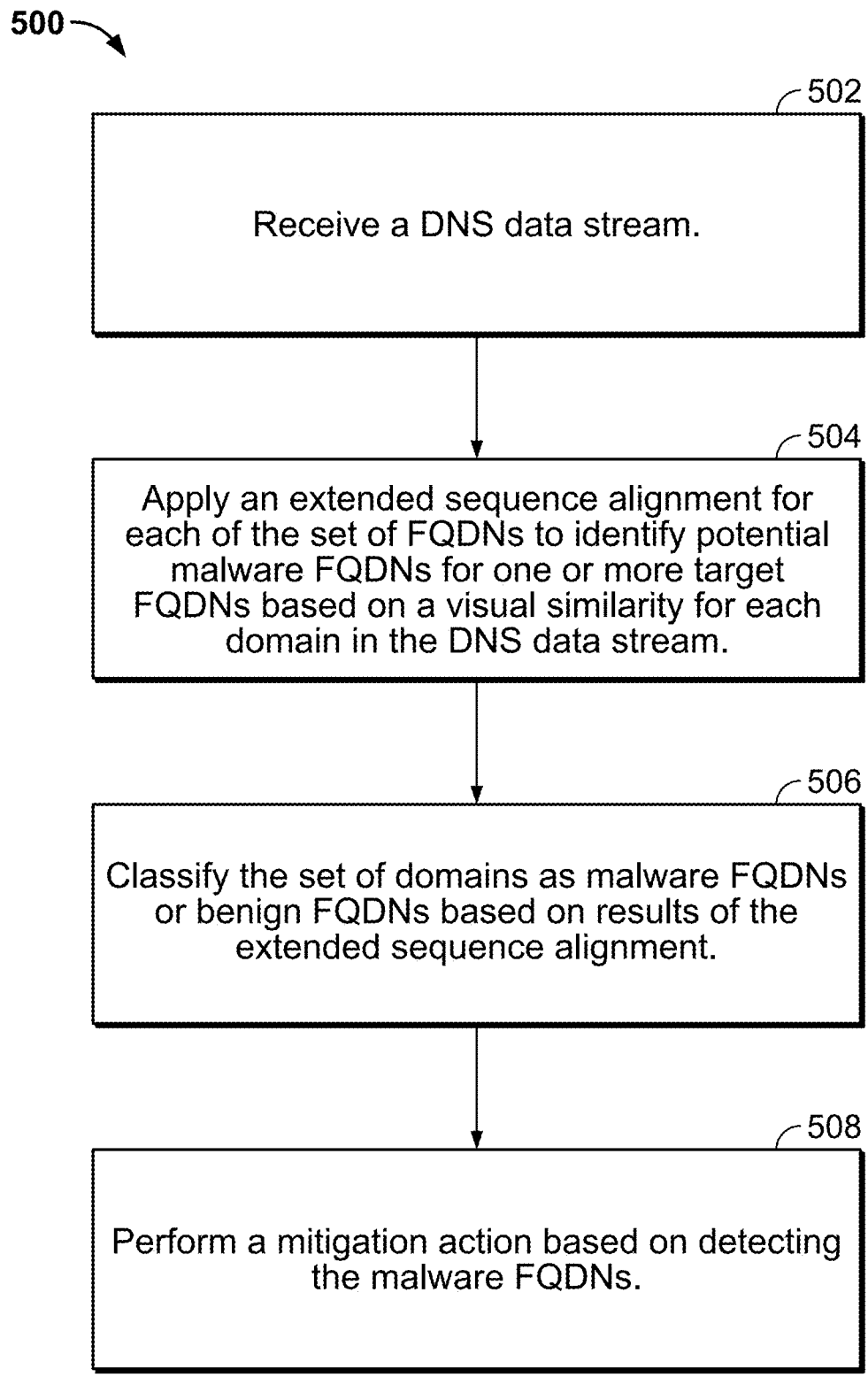

FIG. 5 is another flow diagram illustrating a process for detecting visual similarity between DNS FQDNs in accordance with some embodiments.

FIGS. 6A-C illustrate an enhanced alignment implementation for the system for detecting visual similarity between DNS FQDNs in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Network security is an increasingly challenging technical problem to protect networks and users accessing resources via networks, such as the Internet. The Domain Name System (DNS) is a hierarchical decentralized system that allows assignment of human-readable domain names to resources addressed by numerical IP addresses. Unfortunately, due to its decentralized nature, the system is frequently exploited and abused. The use of fake or misleading domain names (e.g., spoofed domain names) is a popular mechanism employed by malware, phishing attacks, online brand attacks, and/or for other nefarious and/or unauthorized activities that often attempt to trick users into visiting/accessing a site/service associated with the fake or misleading resource references (e.g., Uniform Resource Locators (URLs)—a reference to a network resource that contains protocol, hostname, path, and query). As will be described with respect to various embodiments, we address analysis of hostname component of URL, in the case of Internet it is known as Fully Qualified Domain Name (FQDN). The FQDN allows for uniquely addressing a, for example, server on the Internet, in a hierarchical manner.

The problem of automated detection of lookalike FQDNs is a technically challenging one. Generally, lookalike FQDNs as used herein refer to DNS names that are specifically crafted in a way to resemble some other domains. An attacker uses such domains in order to convince an unsuspecting, inattentive users that the FQDN is either a genuine one or performs a service on behalf of genuine one. Detection of such FQDNs generally includes a comparison of the FQDN with target (genuine) domain from the standpoint of visual similarity.

Example of lookalike domains include the following:
paypal-reset.myid.com
hoogle.com
yahoo-login.com It is widely recognized that lookalike domains represent a serious security problem. Various types of attacks utilize such lookalike domains. For example, phishing attacks often use a domain looking similar to a bank that is used to steal credentials of users.

From the APWG 2021 Q2 report (e.g., publicly available at docs.apwg.org), it is an increasingly costly and challenging network security problem. Specifically, the average wire transfer loss from Business Email Compromise (BEC) attacks is increasing. The average wire transfer attempt in the second quarter of 2020 was $80,183, up notably from $54,000 in the first quarter. As an example, a Russian BEC operation has been targeting companies for an average of $1.27 million. Also, the number of phishing sites detected in the second quarter of 2020 was 146,994, down from the 165,772 observed in the first quarter. Phishing that targeted webmail and Software-as-a-Service (SaaS) users continued to be the biggest category of phishing. Attacks targeting the Social Media sector increased in Q2 about 20 percent over Q1, primarily driven by targeted attacks against Facebook and WhatsApp.

Other types of attacks using visually similar domains include malware download attacks (e.g., drive by downloads, etc.), scams (e.g., see www.securitymagazine.com), and various disinformation and/or social influence campaigns (e.g., various state actors often create legitimately looking "news" and "analytics" websites).

In order to mitigate the risk presented by fake or misleading domain names (e.g., potentially malicious domains), it is useful to be able to automatically detect such fake or misleading domain names (e.g., FQDNs), including homographs as well as other forms of misleading domains as further described herein. However, static prevention approaches such as domain blocklisting and sinkholing are typically not effective in countering fake or misleading domain names (e.g., FQDNs) that are generated by large variety of methods.

There are several techniques frequently used to generate a lookalike FQDN. The attacker first chooses the desired target domain and then applies one or more modifications that preserve the new FQDN visual similarity to the original targets. Such modifications can include use of homographs (English or Internationalized Domain Name-IDN), combosquatting, embedding, character swap, as well as label manipulation and simple domain name editing.

Homograph (AKA Homoglyph) are characters that are visually similar each other. As such, a homograph attack is performed by replacing some characters in domain name with their homoglyphs.

English-based homographs include characters which look similar when displayed by some fonts, in some cases when characters are typed in different registers. Examples of such homographs are l (lowercase L) which is easily confused with (one) and with I (uppercase i), O (capital o) when typed in upper register looks similar to 0 (zero). A few examples of homograph attacks on well-known domain names are shown below.

apple.com
GOOGLE.com

English-based homographs that are frequently found in real traffic also include composite replacements, such a w (W) replaced with vv (double v), m is very frequently replaced with rn (RN), and some other. While this technique is primitive, it is often very efficient, especially in small fonts typically used in Web browser's address bars.

twitter.com
microsoft.com

IDN-homograph is another type of homograph attack that utilizes DNS extension for representing internationalized domain names. It relies on the fact that many characters in native languages are hard to distinguish visually, while their encoding allows register a unique domain name. Contemporary browsers perform the visualization and represent the characters in native form.

Generally, an Internationalized Domain Name (IDN) uses at least one multi-byte Unicode character as a label. The internationalization of domain names enables most of the world's writing systems to form domain names using their native alphabets, which are available on scripts from the Unicode standard. For compatibility with DNS protocols and systems, IDN domains are encoded as ASCII using the Punycode system.

Specifically, Punycode refers to Unicode that can be used to convert words that cannot be written in ASCII for use as domain names. However, Punycode can also be misused to generate fake or misleading domain names (e.g., spoofed domain names) that attempt to impersonate target domain names using Punycode. For example, Punycode is often utilized by such malware, phishing attacks, online brand attacks, or other nefarious activities to generate fake or misleading domain names in order to deceive users into visiting/accessing a site/service associated with the fake or misleading domain name (e.g., URLs).

More specifically, the problem is that humans cannot easily commit Punycode domains (e.g., xn--aa-thringen-xhb.de) to memory, so most systems present these domains in decoded form (e.g., aa-thüringen.de). As such, an IDN inadvertently creates a security problem for domain names, because it allows a vast set of different but, in many cases, visually similar characters for domain naming. As a result, bad actors can attempt to impersonate target domains (e.g., high-value target domain names) by substituting one or more of its ASCII characters with a visually similar but obscure Unicode character, such as shown in the below example homographs.

Combosquatting is another example attack using visually similar FQDNs. Specifically, an attacker creates a domain name by combining the target domain name with some other term. This frequently creates an impression that the domain performs some function on behalf of a genuine one. Example combosquatting attacks are shown below.

paypal-reset-my-id.com
google-activate-account.site

Embedding is another example attack using visually similar FQDNs. Specifically, an attacker appends the target or part of it on the left side (e.g., 3+ level labels) of some other domain. Example embedding attacks are shown below.

google.com.example.com
yahoo-login.mycompany.com

An attack may be based on simple editing and reordering of characters frequently used, especially with longer domain names. In such cases attackers rely on mechanical (typing) mistakes, such as character order, double character, next-key error (AKA fat-fingers), or spelling errors.

payapl.com
hoogle.com
twitter.com

In some cases, attackers may utilize visual separators. In the case of combosquatting, the additional terms are often visually separated from the target label. This is typically done by using '-' or a label separation. Examples of such visually similar domains using this type of visual separation of words are shown below.

google-com.site
google.com-example.com

Also, these types of attacks are commonly used in various combinations with each other for creation of domains/FQDNs that look alike pre-selected target.

These and other types of attacks using visually similar domain names are an increasingly common and complex problem for computer and network security.

Overview of Techniques for Detecting Visual Similarity Between DNS Fully Qualified Domain Names Detection of lookalike FQDN in an observed DNS stream generally includes two major subproblems: (1) a visual difference measurement; and (2) a detection of lookalike FQDNs.

For performing a visual difference measurement, given a set of monitored domains (e.g., www.amazon.com, www.google.com, microsoft.com, netflix.com, etc.) referred below as target FQDNs (or targets), and an observation that includes an FQDN observed on a network, the technical challenge is to measure a visual difference between the observation and targets. Specifically, the objective is to provide such a visual difference measurement with respect to a specific target that is: (1) deterministic (e.g., the visual difference measurement can provide similar results for similar modifications of a given target domain); (2) decodable (e.g., the results can be explained to a person using explanatory text and/or automatically-generated images, as opposed to a machine learning driven solution, such as a neural network, that may serve a decision but such typically cannot be easily conveyed to a person using explanatory text and/or images), and (3) accounts for homographs, prefixes/suffixes, and the structure of the FQDN.

For automated detection of lookalike FQDNs, given visual similarity measurement results, classify if the FQDN is a lookalike of the target it was compared with. As will be further described below, the disclosed techniques for detecting visually similar FQDNs is performed, at least in part, by using a visual comparison of structured strings.

Existing string-matching approaches are generally inadequate for performing the desired detection of visually similar FQDNs. There are several well-known algorithms that perform fuzzy string comparison.

For example, n-gram set comparison approaches that split a target and candidate strings into n-grams and compare the resulting sets are generally deficient. Specifically, such n-gram set comparison approaches are not precise (e.g., tend to error on shorter length targets versus longer length observations). This approach also does not provide a human understandable explanation (e.g., in text and/or images) of why a certain domain was flagged.

As another example, edit distance approaches (e.g., Levenshtein distance) measure the distance between two strings in terms of insert/delete/replace operations associated with some cost value with the objective of minimizing the cost. However, such edit distance approaches are also inadequate. Specifically, such edit distance approaches do not support homographs or more complex sequences and generally are not very well suited to measurement of strings of different lengths (e.g., "google-login" versus "google" would yield a high distance value due to the number of insert operations).

As yet another example, existing sequence alignment approaches attempt to determine an optimal alignment that minimizes the sum of all costs associated with the operations (e.g., prefix, suffix, insert, delete, mismatch, and match relations). However, such existing sequence alignment approaches also have significant deficiencies as such approaches generally do not recognize homographs and more complex sequences. Specifically, the detection of visually similar FQDNs generally can involve analysis of more complex relations, such as the following: single-character homographs (o is replaced by 0); two-character homographs (m is replaced by rn); duplicate characters (google vs gooogle); and/or character swap (two neighbor characters are replaced in order paypal vs payapl).

Another important shortcoming of existing approaches is that they treat both the observation and the target as uniform flat strings. But DNS FQDNs have a structure that generally should be accounted for (e.g., [<label>. +]SLL. <TLD|e-TLD>, where SLL is the second level label (AKA domain name), TLD/eTLD is Top Level Domain and extended TLD). Matches of labels found at different positions may have different significance. For example, account.example.com and account.paypal.com have identical 3-rd level label account, but it should have little impact on the comparison results as the domain name labels (SLLs) are completely different. On the other side, paypal-account.example.com and paypal.com should be flagged as lookalike. As such, it is generally desirable to perform the comparison of target component in decreasing importance order (SLL, TLD/eTLD, prefix labels, where SLL similarity is the most important one). Moreover, existing sequence alignment approaches fail to provide control over alignment preferences. But for detecting visually similar FQDNs, we generally want to recognize visual separators (e.g., '.' and '-', '_' characters) that may isolate target components found in lookalike FQDN.

google-com-example.myexample.com

Thus, what are needed are new and improved techniques for providing domain name and Domain Name System (DNS) security. Specifically, what are needed are new and improved techniques for automatically detecting visual similarity between DNS fully qualified domain names (FQDNs).

Accordingly, various techniques for detecting visual similarity between DNS fully qualified domain names (FQDNs) are disclosed.

In some embodiments, a system, a process, and/or a computer program product for detecting visual similarity between DNS fully qualified domain names (FQDNs) is disclosed. For example, malicious actors often create visually similar FQDNs to impersonate high-value domain name targets and thereby deceive unsuspecting users, such as similarly described above. They typically use such fake/misleading domains to drop malware, phish user information, attack the reputation of a brand, and/or for other nefarious and/or unauthorized activities.

In some embodiments, a system, a process, and/or a computer program product for visual similarity between DNS fully qualified domain names (FQDNs) includes receiving a DNS data stream (e.g., a live DNS data stream), wherein the DNS data stream includes a DNS query and a DNS response for resolution of the DNS query; performing extended sequence alignment for each of the set of FQDNs to identify potential malware FQDNs for one or more target FQDNs based on a visual similarity for each domain in the DNS data stream; and classifying the set of domains as malware FQDNs (e.g., one or more of the malware FQDNs are homographic lookalikes of one or more target domain names, combosquatting lookalikes of one or more target domains, embedding lookalikes of one or more target domains, or any combinations thereof) or benign FQDNs based on results of the extended sequence alignment.

In some embodiments, a system, a process, and/or a computer program product for visual similarity between DNS FQDNs further includes recovering a set of operations to transform a selected target into an observed FQDN (e.g., the set of operations can include one or more of the following operations: (1) match character and mismatch character; (2) insert character and delete character; and (3) swap characters, homograph, and composite homograph).

In some embodiments, a system, a process, and/or a computer program product for visual similarity between DNS FQDNs further includes prefiltering the set of domains for identifying potential malware FQDNs (e.g., suspicious lookalike FQDNs, such as similarly described above) for one or more target domains. The process may include initial association of observation with a subset of target domains where further comparison is performed to verify whether the suspicious lookalike FQDNs are malware FQDNs.

In some embodiments, a system, a process, and/or a computer program product for visual similarity between DNS FQDNs further includes generating a report in a deterministic instruction sequence including a text-based and/or visual-based explanation for each of the detected FQDNs.

In some embodiments, a system, a process, and/or a computer program product for visual similarity between DNS FQDNs further includes performing a mitigation action based on detecting the malware FQDNs. Example mitigation actions can include one or more of the following: (1) blocking the DNS response to impede a client communication with an IP address associated with the malware FQDNs; (2) adding the IP address associated with the malware FQDNs to a blocklist or to a blocklist feed; (3) sending the IP address associated with the malware FQDNs to a firewall; and (4) generating a firewall rule based on an IP address associated with a first malware FQDN; configuring a network device to block network communications with the IP address associated with the first malware FQDN; quarantining an infected host, wherein the infected host is determined to be infected based on an association with the IP address associated with the first malware FQDN; and adding the first malware FQDN to a reputation feed.

The disclosed techniques provide various improvements to detection of lookalike domains. For example, the disclosed techniques provide a more effective and efficient solution for performing FQDN comparisons that are focused on visual differences between such FQDNs. Also, the disclosed techniques can detect more complex modifications to the domain name as further described below. Further, the disclosed techniques can provide a human understandable explanation associated with detections of visually similar FQDNs (e.g., why a certain observed FQDN was flagged as a lookalike to the specific target). In addition, the disclosed techniques can summarize the detected differences in a form suitable for subsequent classification of such visually similar FQDNs as malware or benign as also further described below.

These and other techniques for detecting visual similarity between DNS FQDNs will now be further described below.

Example System Embodiments for Detecting Visual Similarity Between DNS Fully Qualified Domain Names Target Preparation and Enrichment A set of monitored target FQDNs may be provided by users, analysts, or collected in an automated way by, for example, a threat detection system. In general, such a data set insufficiently covers the scope of FQDNs that need to be used for lookalike FQDN detection of specified domains. Example limitations of such a data set will now be described.

For example, many large corporations register their domains in multiple TLDs due to geographical, logistic, or other reasons. It is desirable to include some of these TLDs in the set of monitored domains in addition to provided set. In general, the list of TLD homing is organization-specific, and it is not publicly available. Examples of such multiple TLDs are provided below.

google.com
google.net
google.co.uk

As another example, many large corporations provide several different services using subdomains (e.g., hostnames). It is desirable to detect association to some of these services if used in the lookalike FQDNs.

doc.google.com Document Management Service
maps.google.com Navigation
mail.google.com eMail Service As such, there is a need for a target enrichment process that determines, at least in part, a list of TLDs associated with target domains requested for monitoring.

Figure 1A:
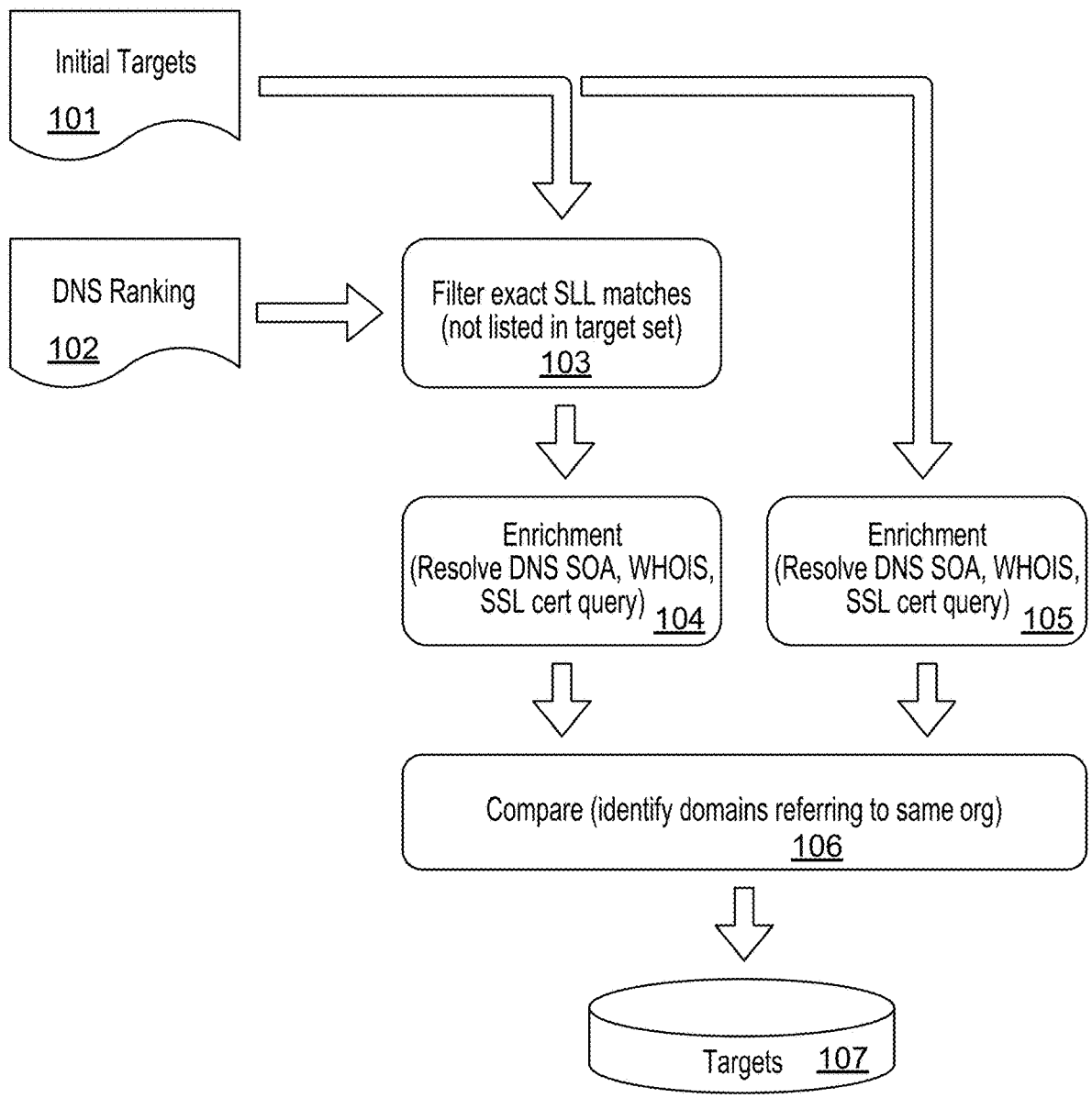
FIG. 1A is a functional block diagram showing a target enrichment process in accordance with some embodiments.

FIG. 1A is a functional block diagram showing a target enrichment process in accordance with some embodiments.

The initial target set 101 of FQDNs desired for monitoring is provided by user, analysts, or collected automatically. It contains a list of FQDNs, optionally with additional metadata such as tags, description, etc. (e.g., Financial, Social Media, etc.).

Referring now to 102, the domain ranking is a file, a database, service, or other source of domains observed on the network within a certain period. An example of such a domain ranking is provided by Alexa Top Sites by Amazon (e.g., available at www.alexa.com).

Referring now to 103, the domain ranking is used to determine domains that share the same SLL as the specified target domains but are not listed in the original target set. These domains may or may not be associated with the actual target FQDN (e.g., and they generally should be filtered). As described below, these domains are generally referred as target candidates.

Referring now to 104 and 105, to further distinguish extra domains associated with a provided set of targets an enrichment process can be applied to both sets, target domains and the target candidates. The enrichment may include, for example, performing one or more of the following: DNS SOA (Start of Authority) resolution, WHOIS data request, retrieval and validation of SSL certificate from the domain, or other data sources.

Referring now to 106, a comparison process validates data collected for target candidates with actual targets from original set. Matching domains are included in the enhanced target set 107.

For convenience of further processing the enhanced target set may be regrouped on target SLL, with all TLDs and monitored prefixes aggregated, as shown in FIG. 1A.

For example, the process of discovery of additional TLDs associated with targets can be based on network observations (e.g., as such, some rarely used TLDs may not be found using such a discovery process). The process may be performed on a regular basis and accumulate the detection results as new TLDs are discovered.

FIG. 1F illustrates examples of DNS-enriched aggregated targets in accordance with some embodiments.

Target Association, Visual Comparison, and Responce

Figure 1B:
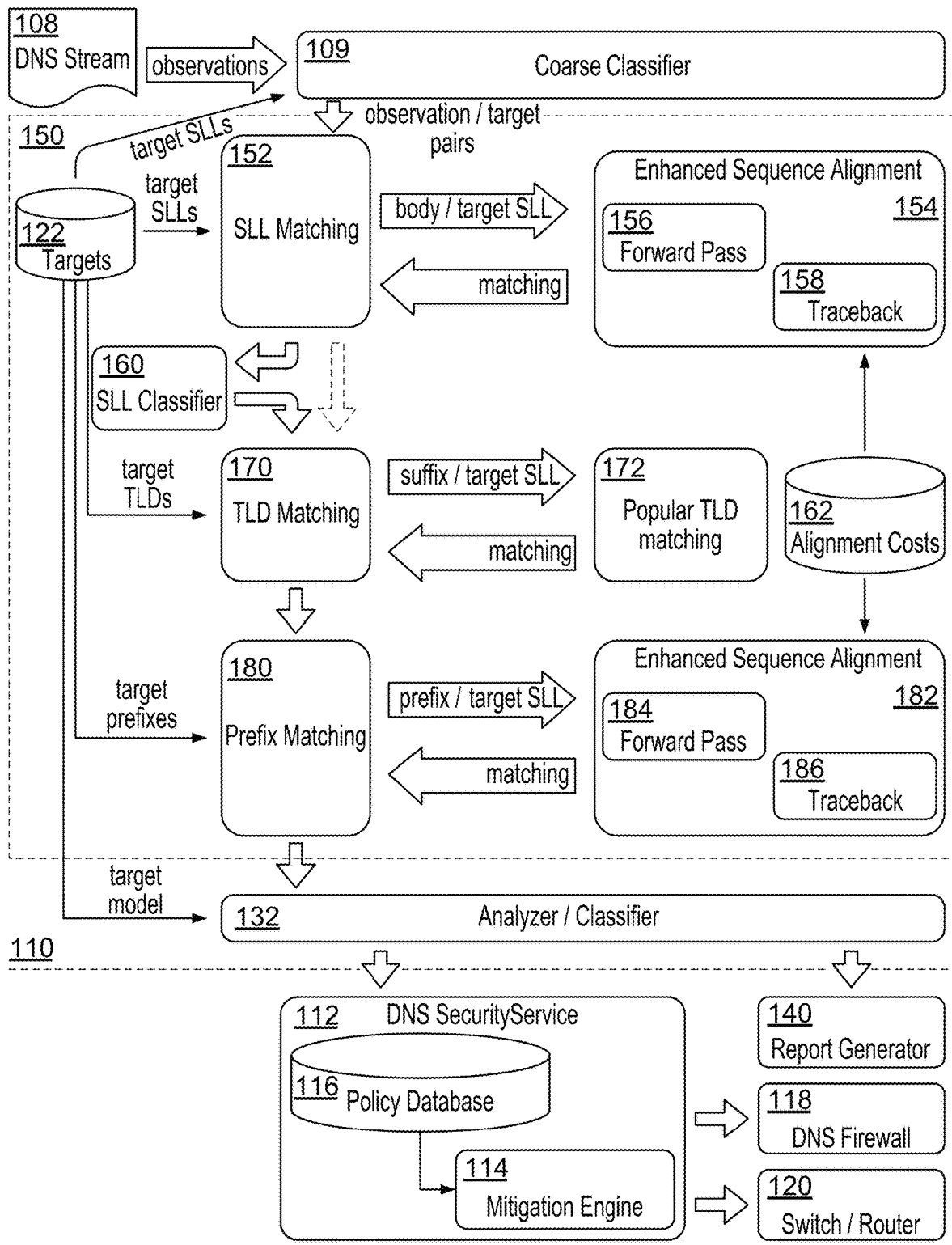
FIG. 1B is a functional block diagram illustrating an architecture of a system for detecting visual similarity between DNS FQDNs in accordance with some embodiments.

FIG. 1B functional block diagram illustrating an architecture of a system for detecting visual similarity between DNS FQDNs in accordance with some embodiments. Generally, the disclosed techniques facilitate a precise visually oriented comparison of two structured strings. The results can then be used for subsequent analysis/classification as further described below.

Referring to FIG. 1B, the system for detecting visual similarity between DNS FQDNs includes an online platform 110 in communication with a DNS security service 112. The online platform receives a DNS stream 108 that may be a live feed of observations or stored in a data store (e.g., a cache or database of observations associated with the received/collected DNS stream data). The aggregated FQDNs are provided to a coarse filter 109 for performing prefiltering based on a set of target FQDNs stored in a data store 122 (e.g., a cache or database of monitored target domains, such as popular or other domains for which it is desired to detect for visually similar suspicious FQDNs (e.g., potential malware FQDNs) attempting to appear similar to any such target domains).

The goal of pre-filtration process (e.g., using coarse classifier 109) is to establish association between an observed FQDN and one or more targets where further matching can then be performed. Observations where no such associations could be established are excluded from further processing.

Figure 1C:
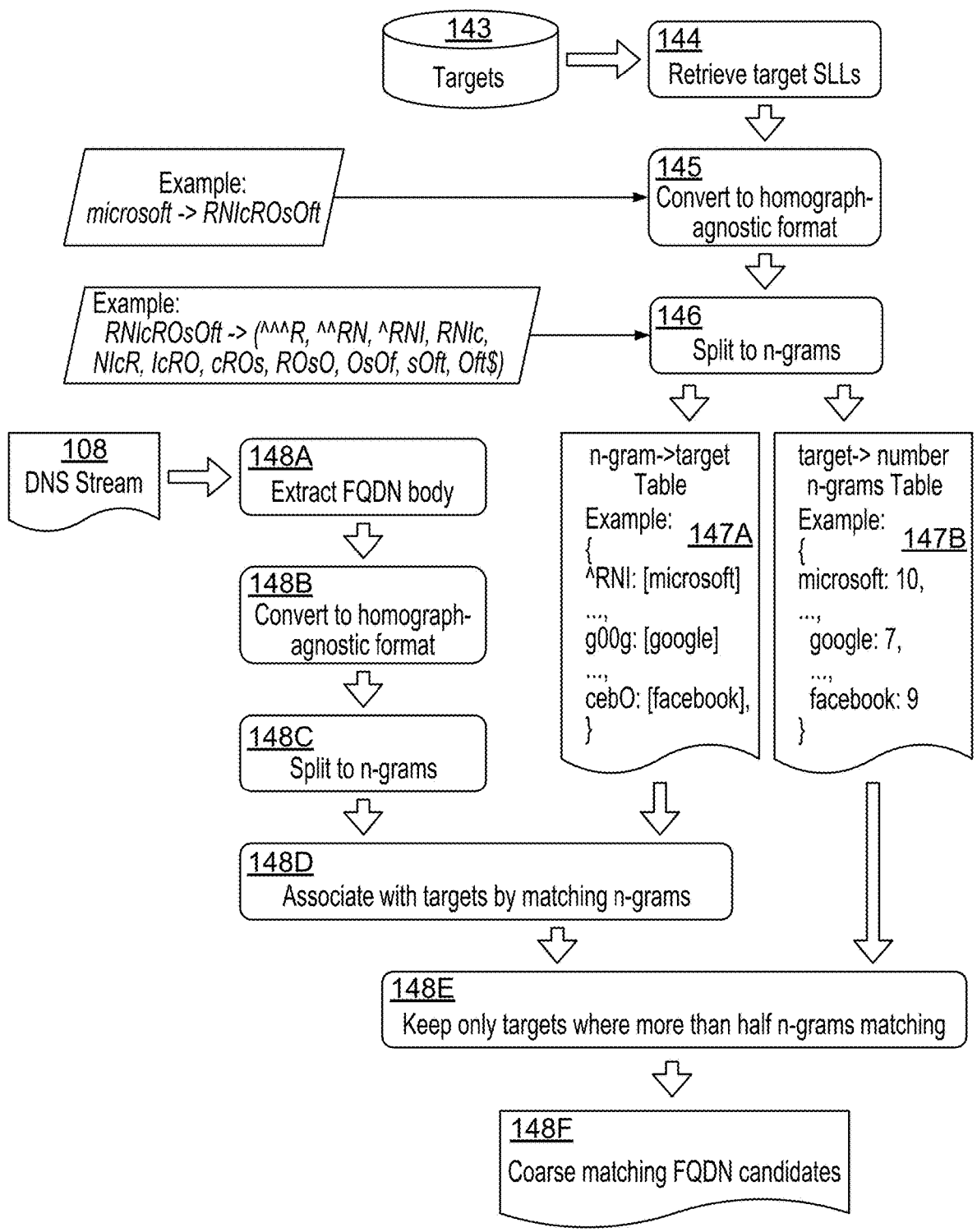
FIG. 1C is a functional block diagram showing targets pre-processing in accordance with some embodiments.

The process of association focuses on minimal similarity of the observed FQDN to target's SLL only, as it represents a required component of similarly looking FQDNs. The process generally should be optimized for speed as its primary goal is to exclude non-relevant observations from subsequent computationally expensive steps. The pre-filtration process can be implemented in several ways. A simple example of such pre-filtration is described below, and it is shown in FIG. 1C. This example pre-filtration processing includes the following two steps 1) target pre-processing, that is performed once for each target, and 2) measurement of similarity between the observed FQDN body and each target.

Referring to FIG. 1C, targets pre-processing is performed as will now be described. For each target (143), extract the SLL of each target (144), convert to lowercase, convert to homograph-agnostic format (145), and split to n-grams. For example, replace all homograph-characters with homograph encoding can be performed. For composite homographs replace the character with its composite representations. For characters that are part of composite representation use appropriate encoding, such as demonstrated by the following examples: simple homographs: {0, 0}->O, {i, 1, 1}->I, this transformation may include IDN homographs (applied post Punycode conversion to Unicode); composite homographs {w}->VV, {m}->RN; composite homograph components {v}->V, r->R, n->N (e.g., microsoft->RNIcROsOft). An example for splitting into n-grams (e.g., 4-grams in this example, ^ and $ are used as start and stop characters) is illustrated by the following: RNICROsoft->^^R, MRN, ^RNI, RNIc, NICR, IcRO, CROS, ROSO, OsOf, sOft, Oft$). At 147A, a table n-gram: target list is generated (e.g., {^RNI: [microsoft], . . . , gOOg: [google], . . . , cebO: [facebook]}). At 147B, a table target: n-gram count is generated.

During observation processing (e.g., for each observed FQDN in a DNS data stream 108), extracting the body of FQDN (e.g., remove the tld/eTLD) is performed at 148A. As an optional step, in the case of IDN support, perform Punycode transformation of the body. The body can then be converted to lowercase. At 148B, the body is converted to homograph-agnostic form, such as similarly described above. At 148C, the body of the FQDN is split into n-grams (e.g., 4-grams, as similarly described above). At this stage of processing, only n-grams present in the target n-gram table are maintained. At 148D, the n-grams associated with each target are counted and assigning to each observation a list of targets with the number of matching n-grams is performed. At 148E, only targets that have at least half of n-grams present in the target are maintained. As such, we can drop observations that have no targets left, and we can expand the targets, so each row contains single observation/target pair. At 148F, coarse matching FQDN candidates is performed as similarly described herein. Example of output association is provided below.

books.google-example: facebook
books.google-example: google
twitter: twitter

Candidate FQDN/Target associations are provided to a visual FQDN similarity detector (150) as shown in FIG. 1B. The visual detector includes 3-step processing as shown at components 152, 170, and 180 with optional intermittent classifier 160 as also shown in FIG. 1B and further described below.

The main processing track of visual detector includes SLL matching component 152, TLD/eTLD matching component 170, and, optional, prefix matching component 180. An optional classifier request is performed by the classifier 160 after the target SLL matching to determine if the similarity analysis shall be continued. The classifier 160 may be omitted in the case of low volume embodiments.

The SLL matcher component 152 receives candidate FQDN/target pairs. The SLL matcher is responsible to determine the best alignment of the target SLL within the candidate FQDN body. The SLL matcher utilizes extended sequence alignment component 154 that includes a forward pass component 156 and a traceback component 158. The extended sequence alignment component performs sequence alignment of target SLL in the observation FQDN body accordingly to the set of alignment costs 162. The SLL matcher splits the observed FQDN body into prefix, matching, and suffix part. It also provides summary statistics and matching code that describes what exactly modifications were performed to the matched SLL part.

As also shown in FIG. 1B, visual SLL matcher 152 relies on the set of costs for the extended sequence alignment. These costs may be determined empirically or learned by several possible approaches. A basic cost learning component that determines a costs set from a set of non-contradicting alignment, as will be described in further detail below.

The SLL classifier 160 receives the results of the target SLL matching from the visual SLL matcher 152. The SLL classifier determines whether the detected SLL matching is sufficient for continued processing or the candidate FQDN is dropped. This step is optional, and it is generally desired in high-volume embodiments.

If SLL classifier call 160 is skipped or if the classifier determined that SLL match is sufficient for further processing, then TLD matching 170 is performed. The goal of this TLD matching processing operation (e.g., using Popular TLD matching component 172) is to determine if any of popular TLDs associated with the target are present in the suffix. The process can be implemented in multiple ways, and it shall determine the following. (1) If the suffix starts with visual separator ('.' or '-', in the case of IDN-encoded strings the list of separators may include native language characters), the length of the separator. (2) If the post-visual separator part of suffix starts with a popular TLD in direct or homograph encoded form. Popular TLDs may not necessarily include all TLDs associated with the target, as in some cases it may lead to confusion (e.g., ru may stand for TLD or language encoding). The list of popular TLDs may be refined specific to a target TLD set. (3) If there is a visual separator after the encoded TLDs and the length of the separator. (4) The remaining tail component of the suffix.

The results of TLD matching 170 are added to the matching results and can include the following: (1) left visual separator length, (2) matching TLD as found (e.g., may be homograph encoded), (3) right visual separator length, (4) the tail component, and/or (5) exact matching TLD. Note that presence of TLD matching is optional and it may be used by the result classifier as an extra feature. In a general case, a lookalike domain may include just an SLL, without any referral to any TLD. For example, paypal-account.xyz.

The prefix matching component 180 is optional. For example, such prefix matching can be performed if the target has listed any specific prefixes (e.g., hostnames) for monitoring and if any prefix is present in the observed FQDN after SLL matching. If the observed FQDN after SLL matching contains a non-empty prefix, then prefix matcher 180 executes enhanced sequence alignment for every prefix associated with the target as further described below.

For example, the target may have a prefix-specific configuration or a common configuration is used to determine whether sufficient prefix matching is found. The results of the matching are represented in the form of (e.g., head, visual separator length, prefix matching, visual separator length, tail) and included into the result set.

The results of prefix detection (the head of the results) may be trimmed to the leftmost label containing detected matching. An example is provided below.

www.en.abc-1.facebook-com.mycompany.com->face-book-com.mycompany.com

The output of visual FQDN similarity detector 150 includes SLL, TLD and prefix detection results that are provided to an analyzer/classifier 132, which will be further described below, for automatically detecting visually similar suspicious FQDNs and any such benign or suspicious FQDN detections are stored in a detections results data store (not shown) (e.g., a cache or database of detection results received from analyzer/classifier 132).

In one embodiment, the disclosed extended sequence-alignment techniques implemented by visual FQDN similarity detector 150 to recover a set of operations to transform specific targets into observed FQDNs that accounts for low-level (e.g., characters) manipulations including the following example operations: (1) match/mismatch character(s); (2) insert/delete character(s); and (3) swap/homograph/composite homograph.

Specifically, the disclosed techniques for detecting visual similarity between DNS FQDNs generally include using an enhanced and extended implementation of the well-known sequence-alignment algorithm with capabilities for performing visual-focused comparisons of structured strings, specifically, comparing two DNS strings including FQDNs from a visual similarity standpoint. For example, the disclosed techniques for detecting visual similarity between DNS FQDNs include support of composite homographs, character swaps, and/or other complex operations to facilitate a more efficient and effective automated detection of visually similar FQDNs as will now be further described below with respect to FIG. 1B.

In one embodiment, visual FQDN similarity detector 140 includes a forward path component as shown at forward pass 156 and a traceback component as shown at traceback 158.

Referring to parameter learning, as the disclosed techniques utilize a solution that includes various free parameters, a solution for automated parameter learning that is used by the forward pass component is also provided as will be further described below.

Referring to forward pass sub-component 156 of the enhanced sequence alignment component 154, the forward path component constructs a string-relation matrix using a general recursion equation supporting multi-character sequences that accounts for visual separators, as will be further described below.

Referring to traceback sub-component 158 of the enhanced sequence alignment component 154, the traceback component recovers an optimal matching of the selected target component (e.g., SLL, prefix) to candidate string accounting for various techniques utilized for generation lookalike, as will be further described below.

Overview of Alignment Processing

Enhanced Sequence Alignment

Well known sequence alignment algorithms (e.g., as described in en.wikipedia.org) generally are based on dynamic programming approach, where a general recurrence relation is applied to incremental combinations of input strings.

The requirement to support two-character combinations as found in composite homographs, character swaps, and duplicate characters, as well as support for homographs require us to update the general recurrence relation part to support two-character relations. The tabular computation and traceback parts are modified accordingly.

In an example implementation, the enhanced sequence alignment algorithm uses the following costs that are pre-defined:

costs.noop—no operation costs.match—the cost if two characters are matching costs.mismatch—the cost if two characters are mismatching each other costs.prefix—the cost if the character is a prefix costs.suffix—the cost if the character is a suffix costs.insert—the cost of insertion of a character costs.delete—the cost if a character is deleted costs.homograph—the cost if a character is a homograph of character in the target (tgt)

costs.duplicate—the cost if the character is a duplicate of previous one costs.swap—the cost if two characters in the candidate string are in opposite order to the target string costs.composite1—the cost if two characters in the candidate string are a two character homograph (e.g., composite homograph) of the character in the target string costs.composite2—the cost if a character in candidate string is a composite homograph for two characters in the target string A description of implementations for an enhanced alignment implementation for the system for detecting visual similarity between DNS FQDNs in accordance with some embodiments is shown in FIGS. 6A-C along with diagrams that explain the construction of tables.

Forward Path (Tabular Computation)

In an example implementation, the forward path component receives a candidate FQDN (cnd) and a target FQDN (tgt). In addition to the standard comparison operators used by the sequence alignment algorithm (e.g., the matching and mismatching characters, insert and delete operations, prefix and suffix), the enhanced sequence alignment recognizes some complex cases including the following operations to address complex relationships:

(1) is_homograph( ) for testing if the pair of characters is a one-char homograph. In the simplest implementation this may be a comparison of English homographs, and in more complex cases, we may include support of IDN characters;

(2) is_composite( ) for testing if the sequence of characters is a multi-char homograph, specifically, is_composite1( ) for replacement of single character with two-character homograph, and is_composite2( ) for replacement two characters with a single-character homograph;

(3) duplicate characters is the case when the candidate (cnd) string contains two identical characters matching to a character in the target (tgt) string; and (4) swapped characters is the case when if the end characters match the tgt characters in reverse order.

Initialization of Data Structures

The forward path computation constructs two tables: the cost tables F with dimensions [len($S_{cnd}$)+2, len($S_{tgt}$)+2] and the operations table D with the same dimensions. The cost table contains minimal costs for all incremental comparison of strings cnd and tgt. The D table is used for traceback and in each cell it stores encoding of the minimal cost operation that allowed to reach the position. As all operations have specific constant offsets to the previous operation, the traceback is trivial. We also prepend the end and tgt strings with a special start character '^' to avoid complexity in comparing two-character sequences in the beginning of the strings.

The cost table F is initialized in the following way. The row 0 and column 0 are initialized with prohibitively high cost. Then the row 1 is initialized with cost of incremental character deletion and the column 1 is initialized with incremental prefix. The position F[1,1], corresponds to NoOp and contains costs.noop value. As shown in FIG. 6A, the Initialization section describes the initialization procedure for matrices F and D.

Tabular Computations

The process of tabular computation processes input strings in incremental format. The process is illustrated in the FIG. 6B (e.g., showing the Forward Path (Tabular Processing)).

For each combination of substrings, it computes costs of all applicable operations and then it determines optimal operation for the case.

--- for all 0 < i < len( $s_{cnd}$)
for all 0 < j < len( $s_{tgt}$)
if $s_{cnd}$(i) = $s_{tgt}$(j): $d_{match}$ = F(i − 1, j − 1) + costs.match
if $s_{cnd}$(i) ≠ $s_{tgt}$(j): $d_{mismatch}$ = F(i − 1, j − 1) + costs.mismatch
if is_homograph($s_{cnd}$[i], $s_{tgt}$[j]): $d_{homograph}$ = F(i − 1, j − 1) + costs.homograph
if not end of tgt: $d_{insert}$ = F(i − 1, j) + costs.insert
if end of tgt: $d_{suffix}$ = D(i − 1, j) + costs.suffix
$d_{delete}$ = D(i, j − 1) + costs.delete
if i > 1 and $s_{cnd}$[i − 1] == $s_{cnd}$[i] == $s_{tgt}$[j]: $d_{duplicate}$ = D(i − 1, j) + costs.duplicate
if i > 1 and j > 1 and $s_{cnd}$ [i − 1] == $s_{tgt}$ [j], $s_{cnd}$[i], $s_{tgt}$ [j − 1]: $d_{swap}$ = D(i − 2, j − 2) + costs.swap
if i > 1 and is_composite1($s_{cnd}$[i − 1], $s_{cnd}$[i] , $s_{tgt}$[j]): $d_{composite1}$ = D(i − 2, j − 1) + costs.composite1
if j > 1 and is_composite2($s_{cnd}$[i], $s_{tgt}$[j − 1], $s_{tgt}$[j]): $d_{composite2}$ = D(i − 1, j − 2) + costs.composite2

-continued

D[i, j] = max($d_{match}$, $d_{mismatch}$, $d_{homograph}$, $d_{insert}$, $d_{suffix}$, $d_{delete}$, $d_{duplicate}$, $d_{swap}$, $d_{composite1}$, $d_{composite2}$)
Op[i, j] = arg max($d_{match}$, $d_{mismatch}$, $d_{homograph}$, $d_{insert}$, $d_{suffix}$, $d_{delete}$, $d_{duplicate}$, $d_{swap}$, $d_{composite1}$, $d_{composite2}$)

---

Figure 2A:
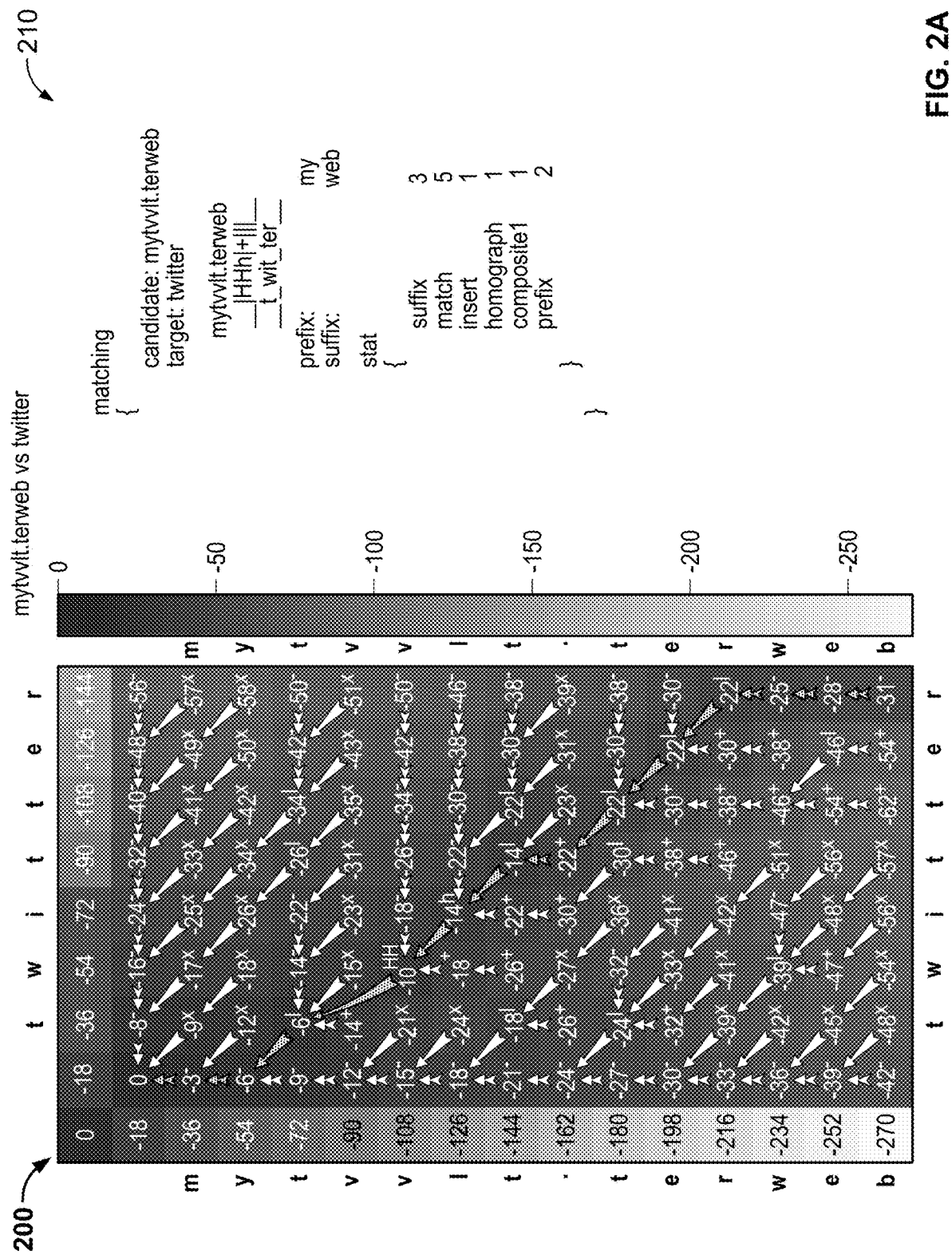

FIGS. 2A-K illustrate examples of the Forward Path processing in accordance with some embodiments. Specifically, FIG. 2A illustrates an example of a homograph-aware value/operation matrix as shown at 200 and the matching summary as shown at 210. For example, a composite homograph uses the two characters "vv" to appear similar to a single character "w" as shown in FIG. 2A. In an example implementation, the forward path processing includes building a dynamic table and filling it up with costs starting in the upper left corner and then traceback from the end following a minimal penalty route to recover the expanded strings and alignment as shown in FIG. 2A for the candidate of 'mytvvlt.terweb' and the target of 'twitter' as shown at 200. The matching result includes a summary of the findings in the best alignment of the domain and the target as shown at 210.

Traceback

In an example implementation, the traceback component processes the value/operation matrix produced by the forward pass operations. Specifically, the traceback component recovers the optimal alignment of candidate and target strings. The functionality performed by an example of traceback is shown in FIG. 6C.

In this example implementation, the traceback component provides the exact difference script for generation of explanations (e.g., used by report generator 140 as further described below) and provides a vectorized summary of modifications for the classifier (e.g., used by analyzer/classifier 132 as further described below).

Additional Illustrations of Alignment Forward-Path/Traceback

The example images (e.g., FIGS. 2A-K) show combined Forward Path/Traceback results in a single matrix plot. The matrices were compiled a pre-computed cost set. Different costs set may result in different alignment. Each cell of the matrix shows a value of the cost table and encoded optimal operation for the cell: 'l'—match, 'x'—mismatch, '+'—insert, '-'—delete, 'h'—single character homograph, '_'—prefix and suffix, 'HH'—composite two character homograph, '< >'—character swap, '/' duplicate of previous matching character. Arrows show the traceback path for the operation associated with each cell. The traceback operation starts with low-right corner of the table and follows the minimal cost path according to arrows. The optimal traceback is highlighted with red arrows. The images listed below are used as an illustration and do not cover all possible combinations of alignment.

Figure 2B:
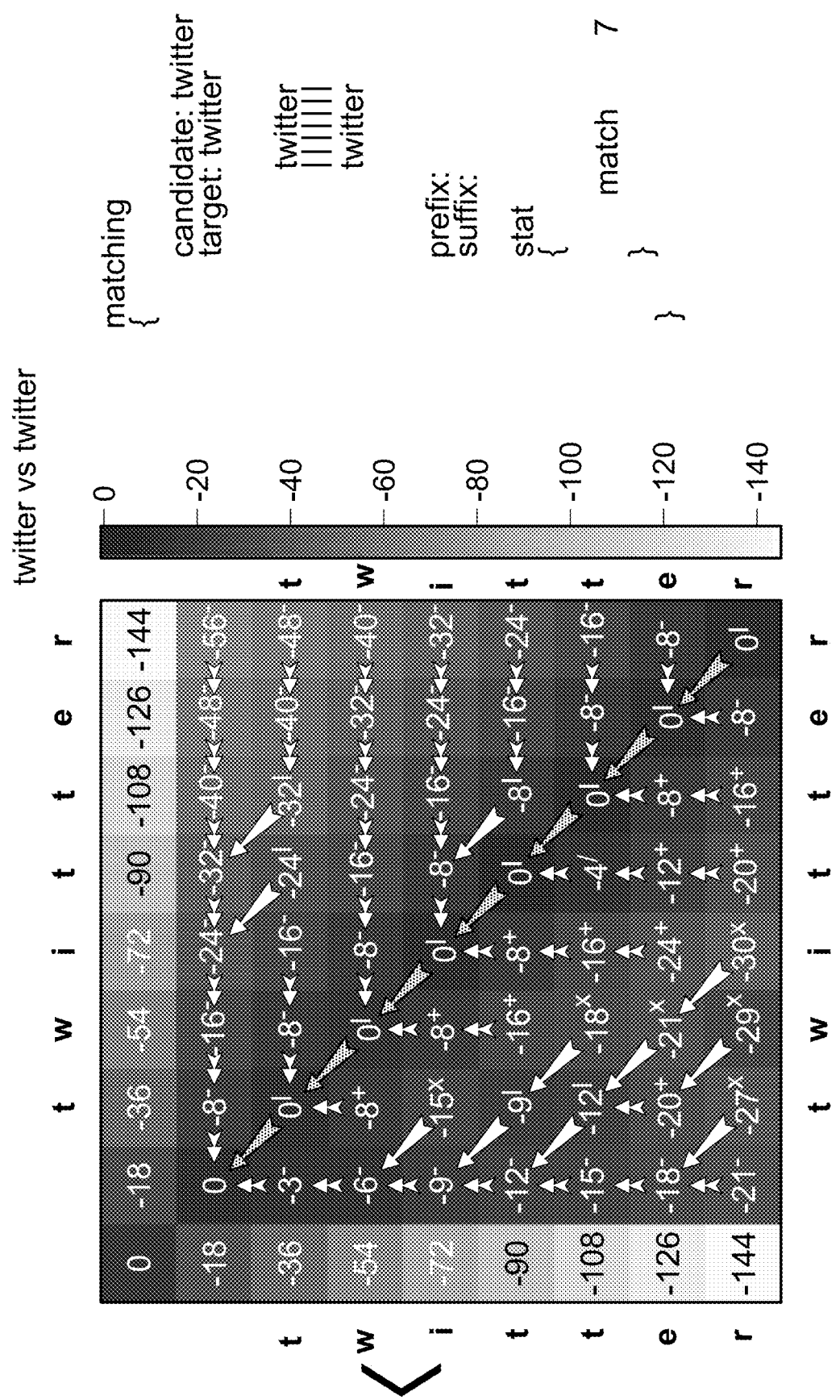

Exact match FIG. 2B (twitter vs twitter) shows the how the cost matrix and traceback looks for exactly matching strings.

Figure 2C:
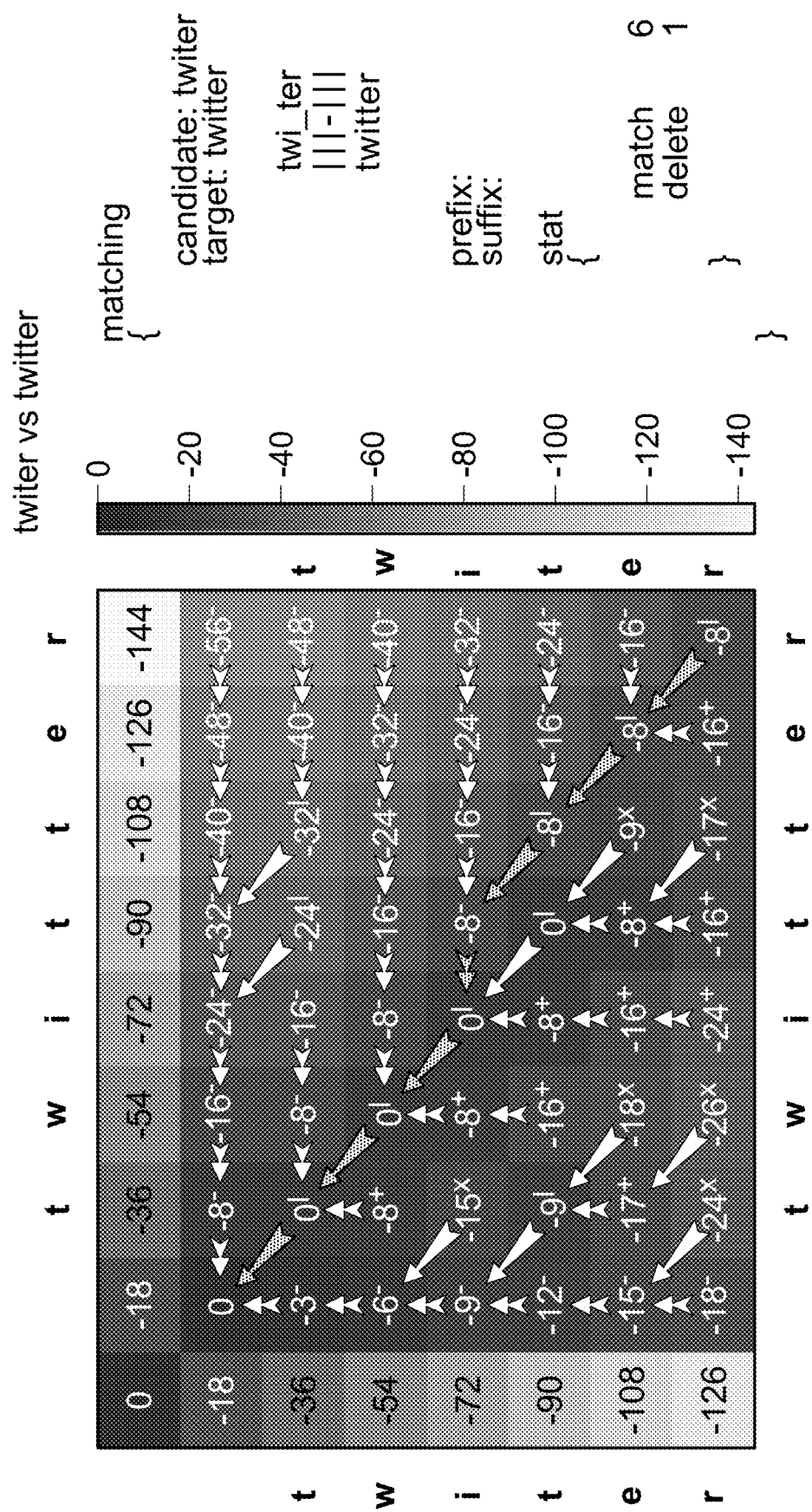

Delete character FIG. 2C (twiter vs twitter) shows an example of alignment when the candidate string is missing one of characters in target.

Figure 2D:
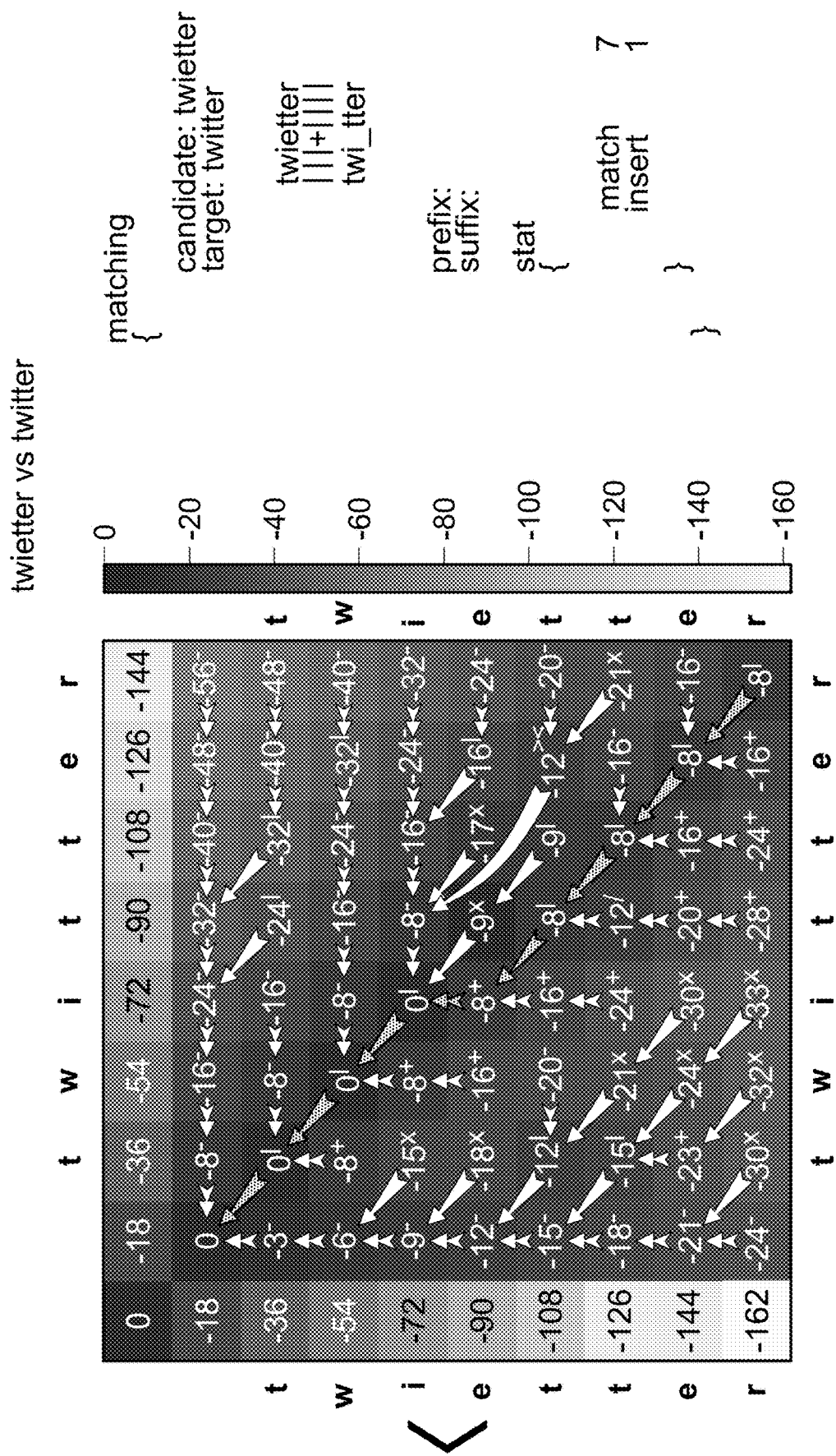

Insert character FIG. 2D (twietter vs twitter) is an illustration of alignment in the case when the candidate string has extra character inserted. The case when the character is inserted inside of the string is different from edge-insertion cases which are detected and prefix and suffix operations.

Figure 2E:
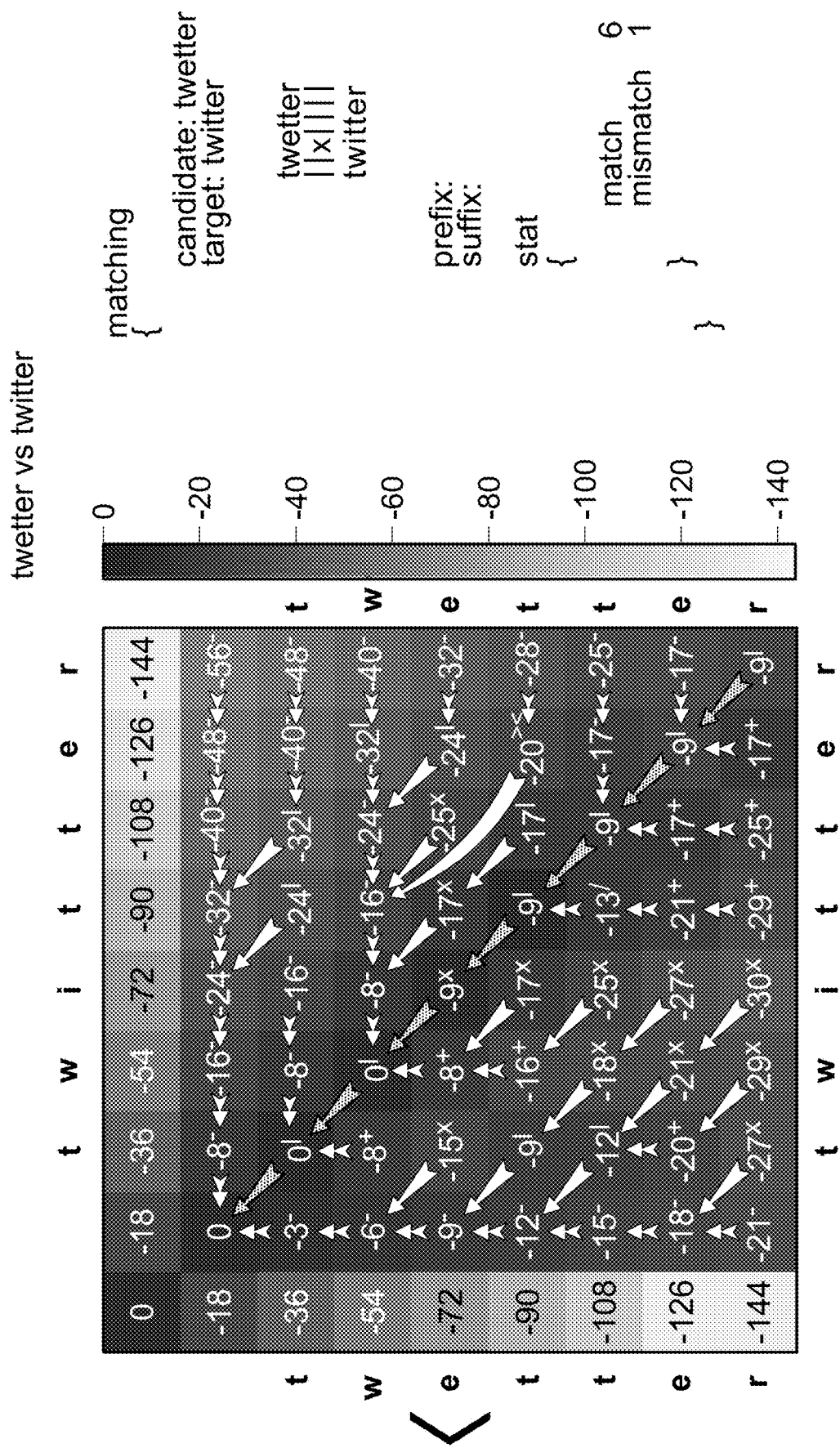

Mismatching character FIG. 2E (twetter vs twitter) shows how mismatching character case is processed.

Figure 2F:
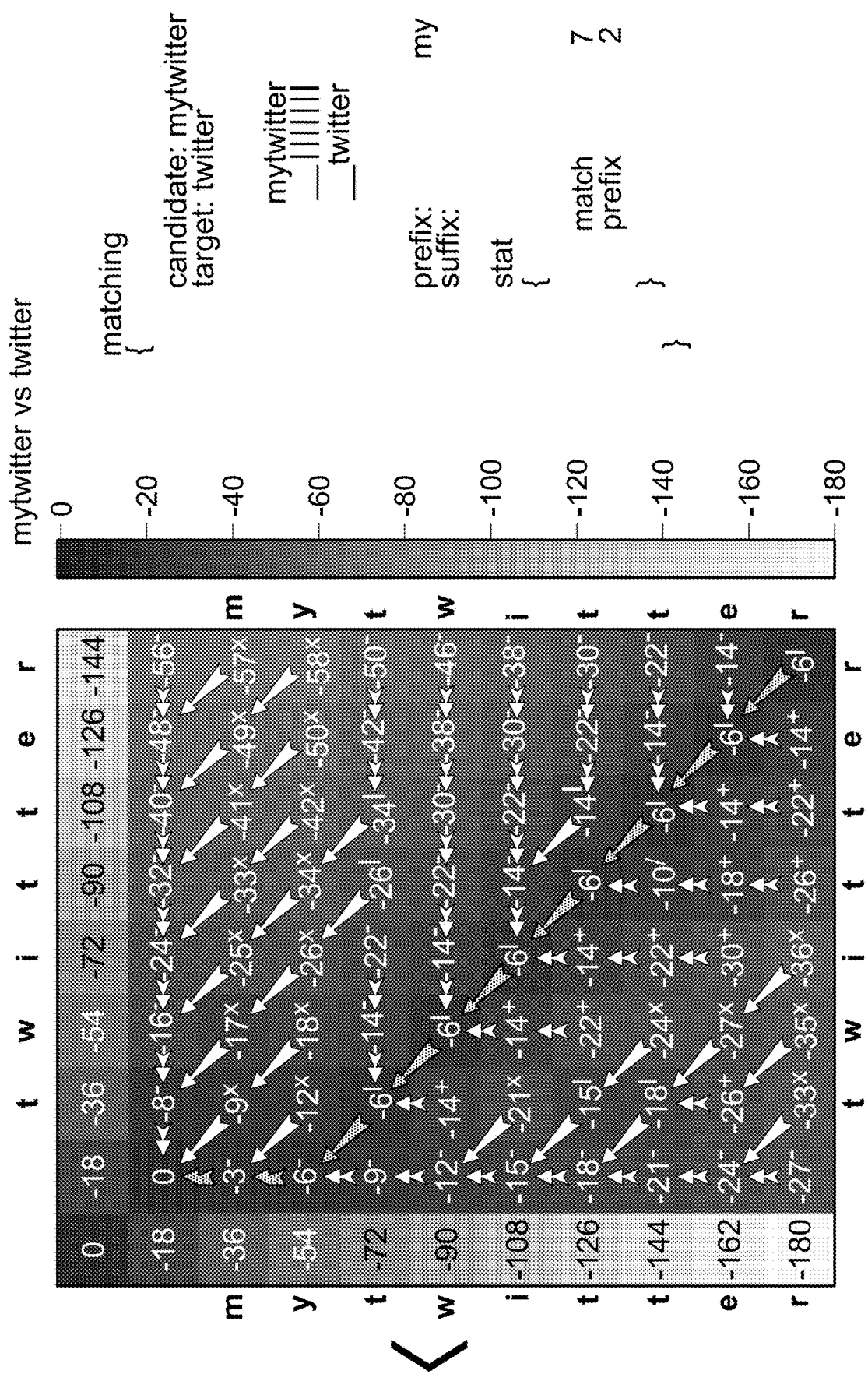

Prefix FIG. 2F (mytwitter vs twitter) is a variant of insert when new character(s) are found in front of best alignment.

Figure 2G:
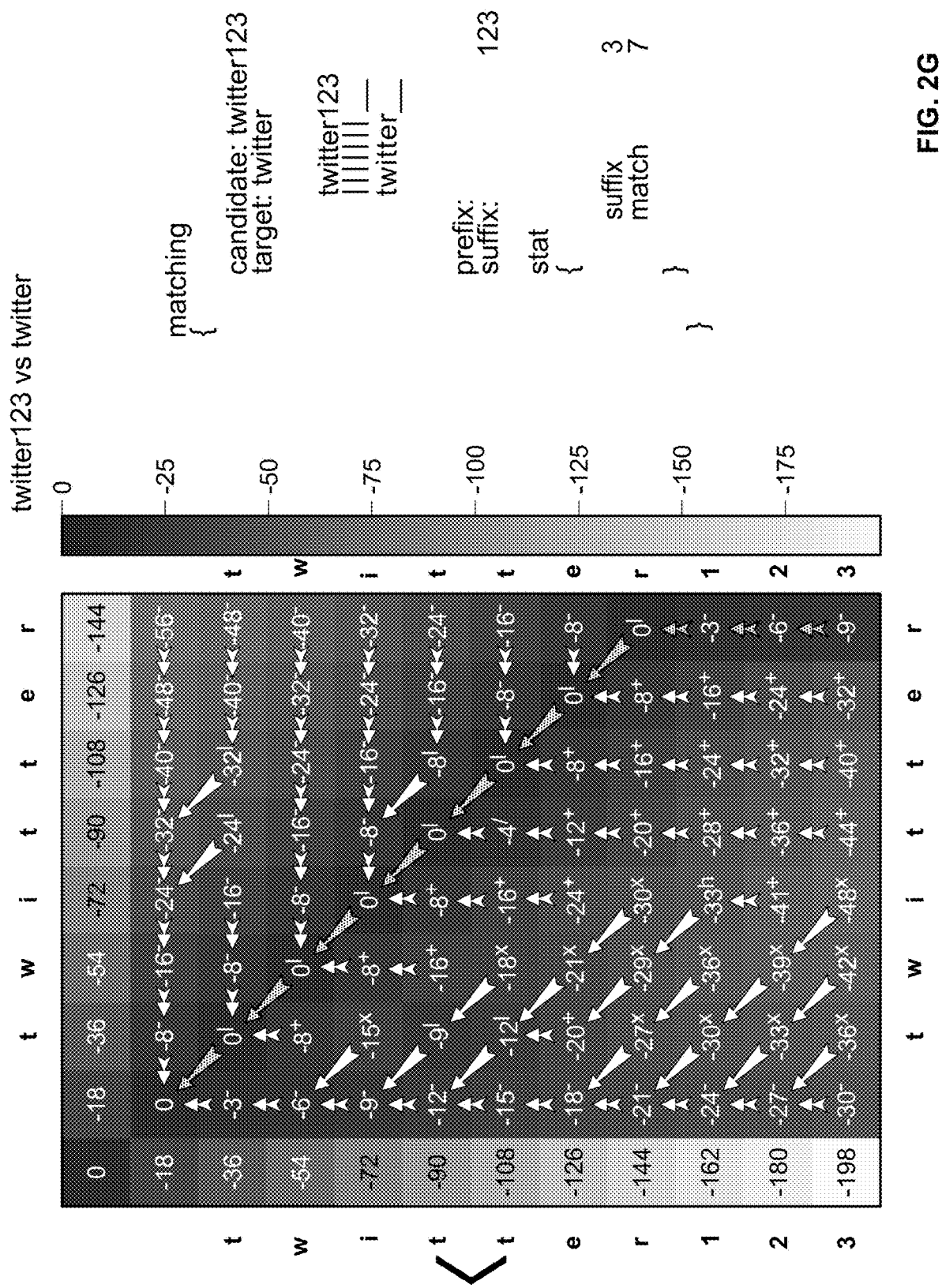

Suffix FIG. 2G (twitter123 vs twitter) is another variant of insert when new character(s) are found after the best alignment.

Figure 2H:
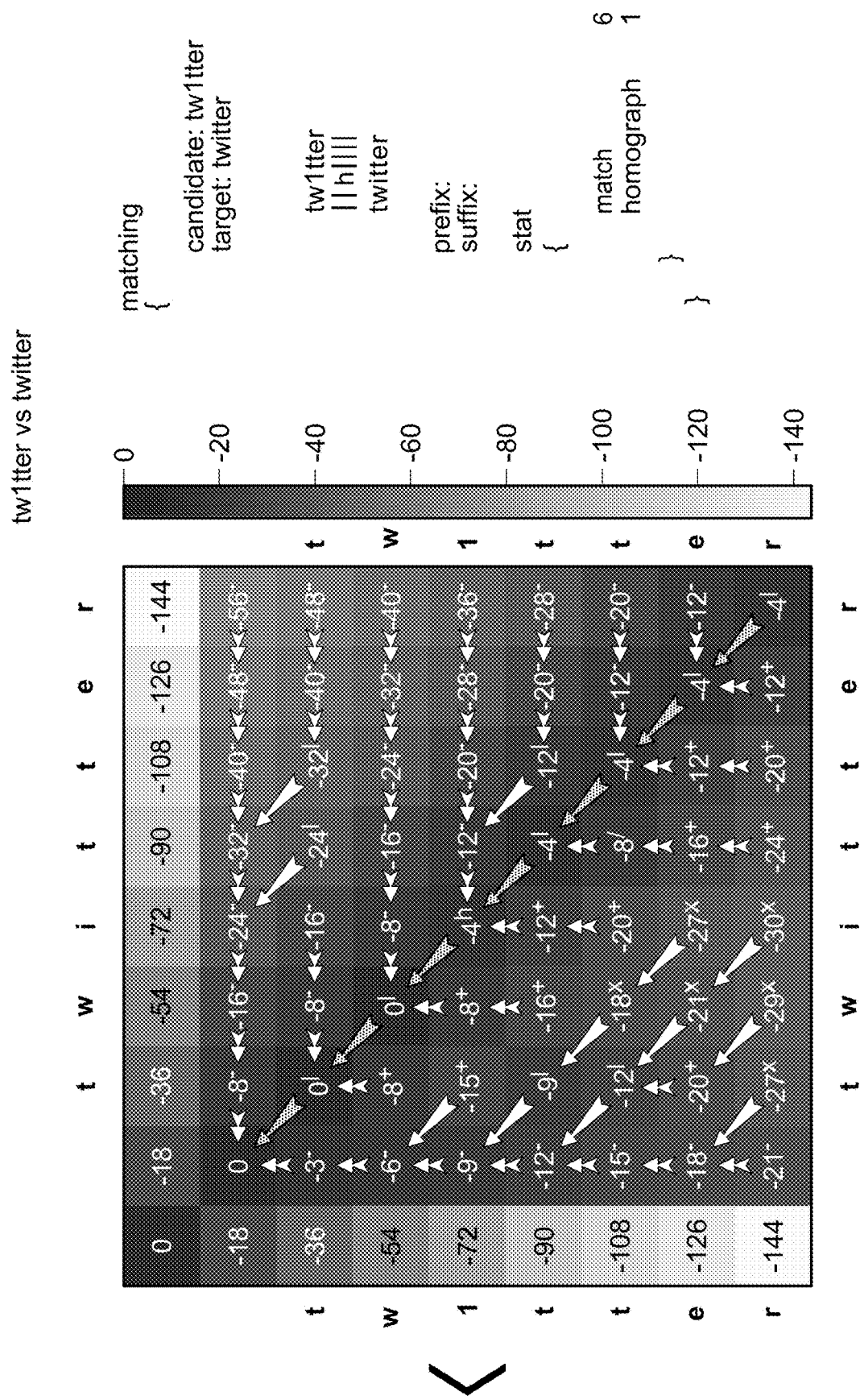

Homograph FIG. 2H (twitter vs twitter) is a special case of mismatching character, such as when the character in the target string is replaced by a homograph.

Figures 1, 2I:
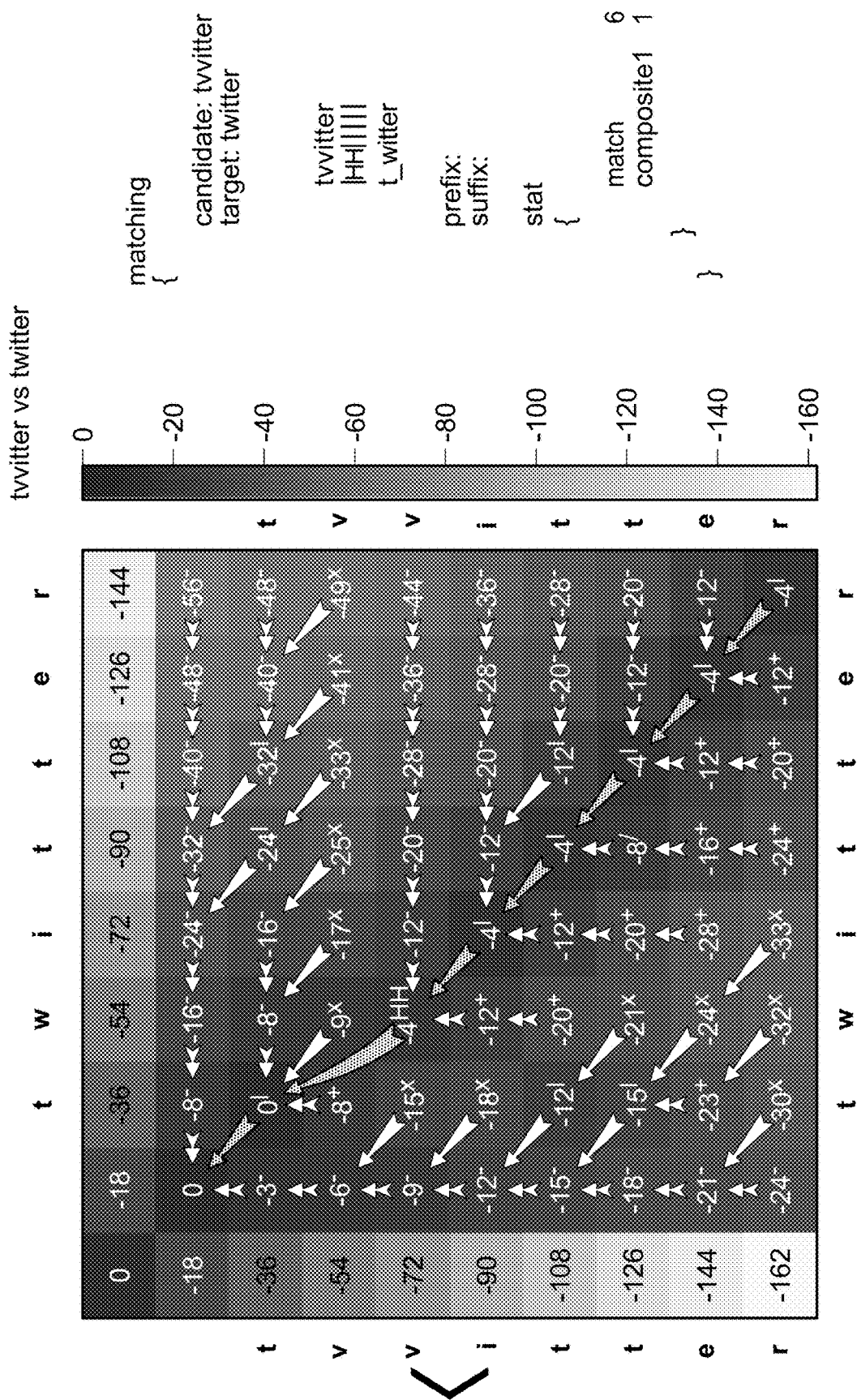
FIG. 1E illustrates example reports providing human-friendly explanations of visual similarity between a detection result and the associated target in accordance with some embodiments.
FIG. 1F illustrates examples of DNS-enriched aggregated targets in accordance with some embodiments.
Figures 2, 2I:
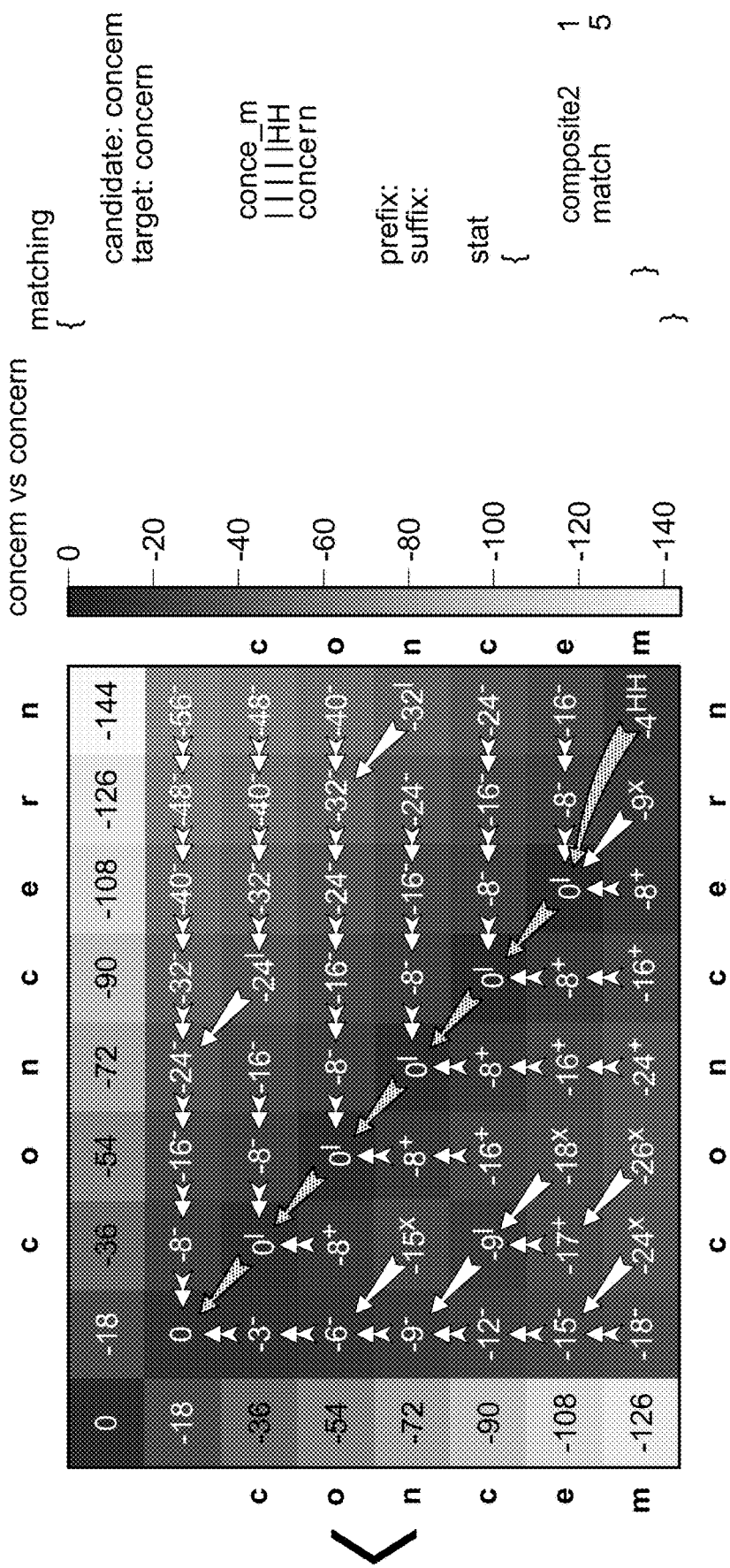

Composite homograph FIG. 2I (twitter vs twitter as shown at 2I-1 and concern vs concem as shown at 2I-2) shows how the enhanced string alignment handles the case when a single character is replaced with two character representation. There are two cases individually illustrated, twitter vs twitter shows a single character in target replaced with two characters in the candidate string as shown at FIG. 2I-1. The other case, concern vs concem shows the opposite variant when a single character in candidate string replaces two characters in the target string as shown at FIG. 2I-2.

Figure 2J:
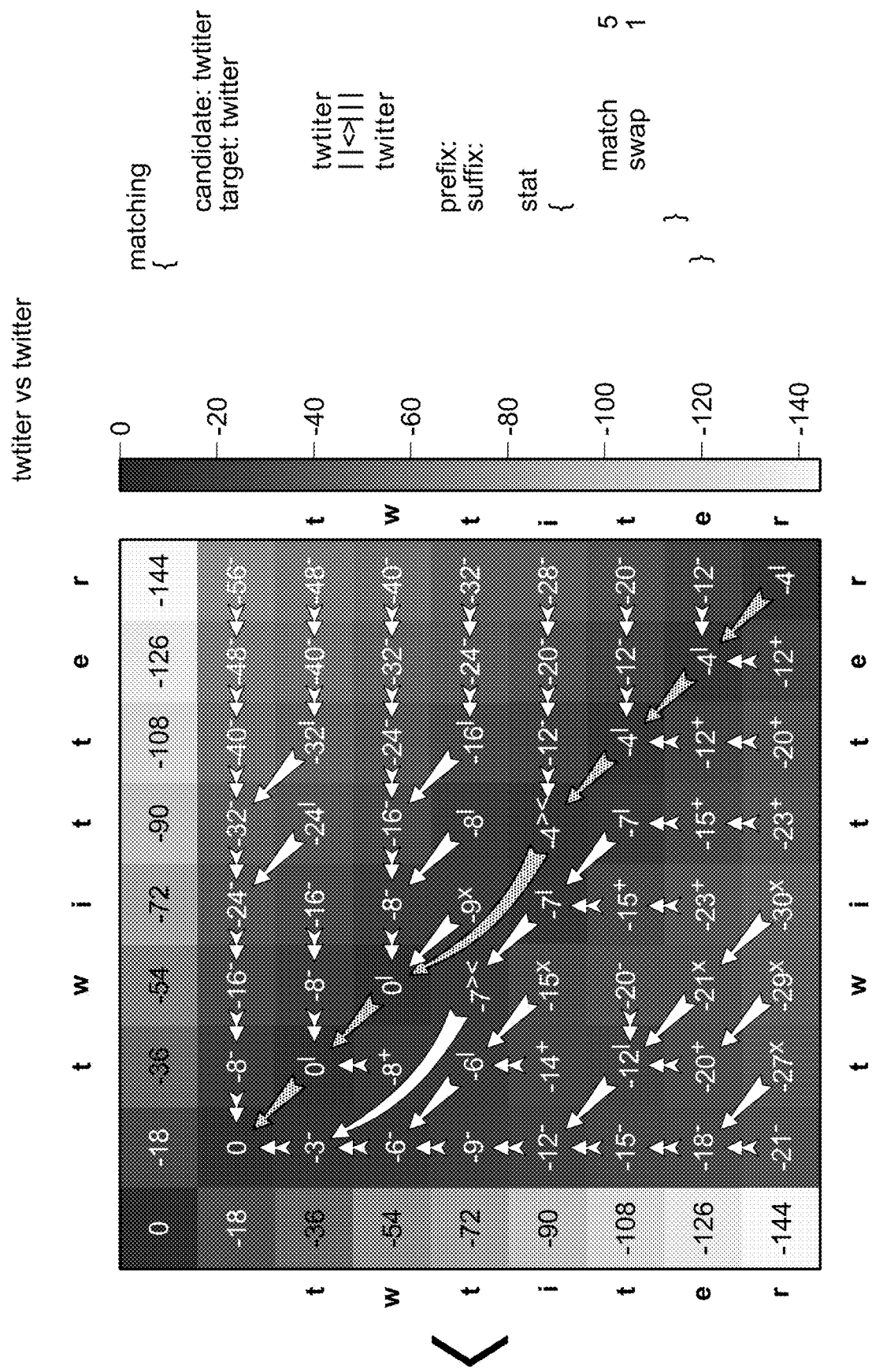

Character swap FIG. 2J (twtiter vs twitter) illustrates frequent typograph (mistyping) variant processing.

Figure 2K:
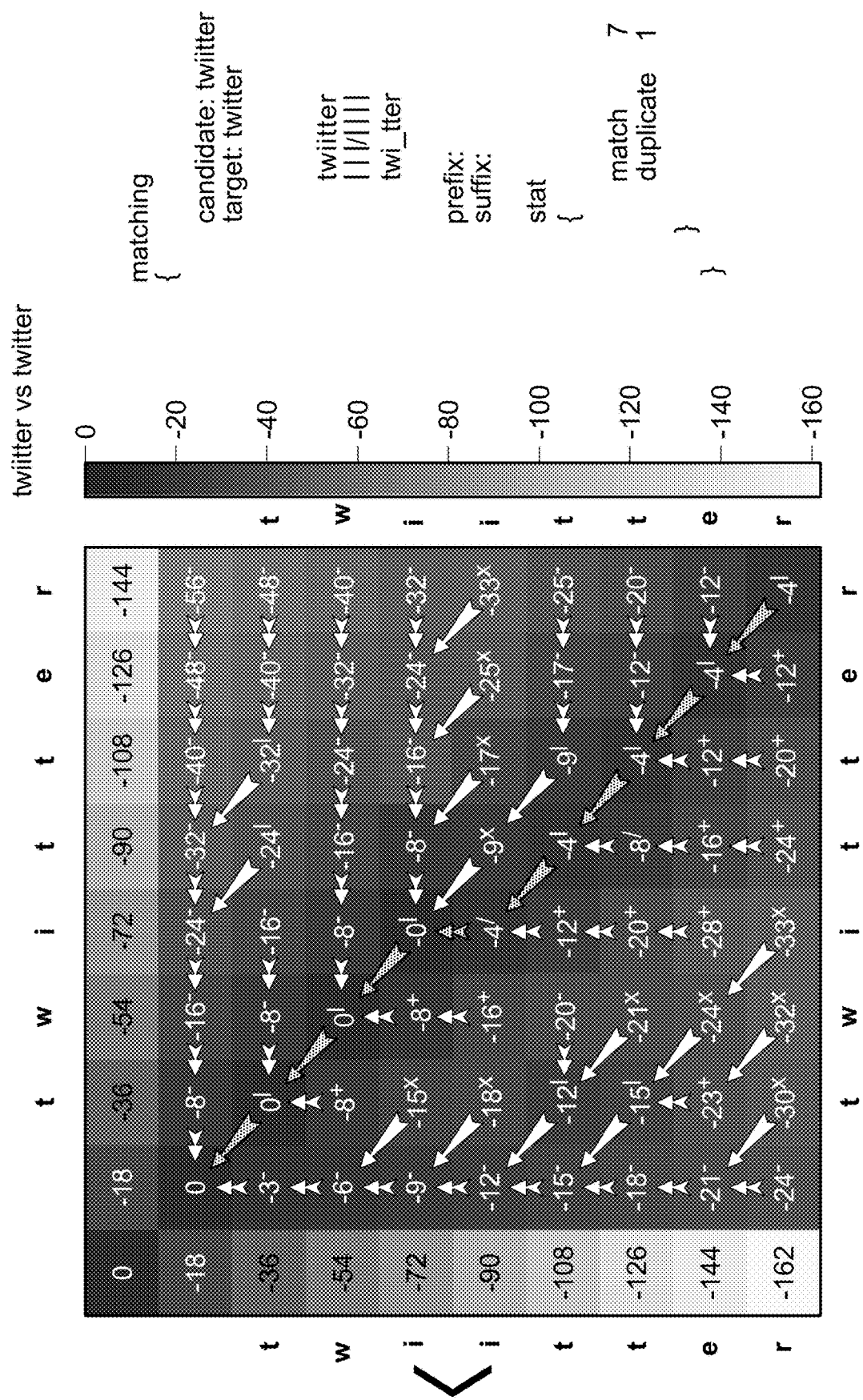

Character duplication FIG. 2K (twiitter vs twitter) shows an example of the cost matrix in the case when a character duplicate matching to the previous character in the target string is identified.

Target TLD Matching in Suffix Part

The target matching processing operations can be implemented in several possible ways. We show a straightforward implementation that satisfies basic requirements. The implementation described below, relies on two facts: 1) in general TLD is a short string, and 2) not all TLDs associated with target may provide extra information (e.g., in some cases they may be confusing, as shown above, ru found in the suffix may refer to language choice or it may represent a TLD encoding).

Popular Target Preparation Operations

1. Create TLD variant reverse table for that maps homograph-expanded variants back to original TLD. I.e {'com': 'com', 'com': 'com', 'corn': 'com' 'cOrn': 'com', 'org': 'org', 'Org': 'org', . . . }.

TLD Matching Process

1. Check if the suffix starts with a visual separator ('-' or '.'). If it is so, skip visual separator characters, provide the number of skipped characters as the left separator length value.

2. Check if the remaining part of the suffix starts with any key in TLD variant reverse table. If key is found, these is matching TLD variant.

3. Check if the part of the suffix string after found TLD variant has any visual separator characters. If so skip them and provide the number of these characters as the right separator length value. The remaining part of the suffix is referred as suffix tail below.

4. Aggregate findings and return tuple (left_separator_length, TLD matching, right_separator_length, suffix tail, true TLD), where the true TLD refers to actual TLD which matching was found. Example "--c0m.myexample"->(2, c0m,1, myexample, com).

Target Prefix Matching of Prefix Part

Prefix matching of FQDN, as described below, is applicable only to 1) targets that have at least one non-empty prefix specified, and 2) FQDNs that have non-empty prefix in front of matching. For combination of the candidate FQDN and each target prefix, an enhanced sequence alignment process is applied. The results are validated for minimal matching requirements, and if matching is established, the prefix is added to the detected prefix list associated with the FQDN.

After the prefix matching is completed for all target FONDs, the final list is exploded into individual records. Each record may be trimmed to the nearest label on the left side. If the list of detected prefixes is empty, the prefix matching is not included in results. The enhanced sequence alignment of the prefix may use the same costs set as the SLL matching, or alternatively, utilize different costs.

Parameter Learning

Referring to traceback component 158 as shown in FIG. 1B, the disclosed forward-path and traceback solutions have costs and free parameters. In an example implementation, a supplementary algorithm for automated parameter learning is provided. Specifically, the parameter learning algorithm takes a set of desired mutually non-contradicting alignments as an input and iterates through the provided alignments and adjusts the set of parameters for each sample in such a way that the forward-pass algorithm matches the sample that produces suggested values for free parameters or flags if the training set contains contradictions.

The free parameters required by the forward path tabular computation may be determined in several ways. The simplest but not the most efficient approach is performed using an empirical selection of values based on trial and error passes. Several other ways exist. A simple modification of forward path algorithm to accept pre-defined example allows automated selection of values.

The training examples are presented in form of short variants of strings (e.g., up to 4 characters) and operations that represent correct alignment. In order for the algorithm to converge, the training examples included into the set must mutually non-contradicting.

Example of Training Subset

['abc', 'abc', ('MATCH', 'MATCH', 'MATCH')]
['abc', 'axc', ('MATCH', 'MISMATCH', 'MATCH')]
['abc', 'ac', ('MATCH', 'INSERT', 'MATCH')]
['ac', 'abc', ('MATCH', 'DELETE', 'MATCH')]
['1abc', 'abc', ('PREFIX', 'MATCH', 'MATCH', 'MATCH')]
['abc1', 'abc', ('MATCH', 'MATCH', 'MATCH', 'SUFFIX')]
['abbc', 'abc', ('MATCH', 'MATCH', 'DUPLICATE', 'MATCH')]
['acb', 'abc', ('MATCH', 'SWAP')]
['aoc', 'aOc', ('MATCH', 'HOMOGRAPH', 'MATCH')]
['avvc', 'awc', ('MATCH', 'COMPOSITE1', 'MATCH')]
['awc', 'avvc', ('MATCH', 'COMPOSITE2', 'MATCH')]

Initial values are set as following:

Costs are represented as an array, including NoOp that occupies zero position, initial values are set to 0. Position of costs associated with each operation match to index function index (operation).

Training Example Pre-Processing

Each training matching is transformed into a sequence of positions and expected matching values (e.g., referred to below as a control point):

For example: ['acb', 'abc', ('MATCH', 'SWAP')]-> ['acb', 'abc', ((1,1, 'MATCH'), (3,3, 'SWAP'))]

['avvc', 'awc', ('MATCH', 'COMPOSITE1', 'MATCH')]->['avvc', 'awc', ((1,1, 'MATCH'), (3,2, 'COMPOSITE1'), (4,3, 'MATCH'))]

The Forward Cost Update

The forward path algorithm is modified in the following way, as will now be described.

In addition to the candidate and the target strings, the forward path receives the list of control points in the form (cnd position, tgt position, matching operation).

When reaching a control point, the algorithm compares the expected operation and the actual operation that yielded optimal value. If expected and actual operation mismatch, cost of the actual operation is increased. The algorithm terminates and returns updated costs value.

Example Full Training Process

For each example in training set:
  Perform the forward-cost-update algorithm.
    If the algorithm updated costs, reset the loop of training examples, start processing all training examples again.
    If the algorithm successfully completed and did not yield updated the cost, all values have values that satisfy the processed example.
    Proceed to the next example.
    Subtract from the costs the minimal cost value (e.g., prevent the values from growing too large).
    Repeat until a full cycle makes no costs modifications.
  Note that the described algorithm requires a set of non-contradicting examples to converge. Other optimization algorithms may be used as well.

Analyzer/Classifier

Referring to FIG. 1B, online platform 110 also includes a classifier shown at 132 for providing an inline malware FQDN detection component based on the visual FQDN similarity detector 150.

Figure 1D:
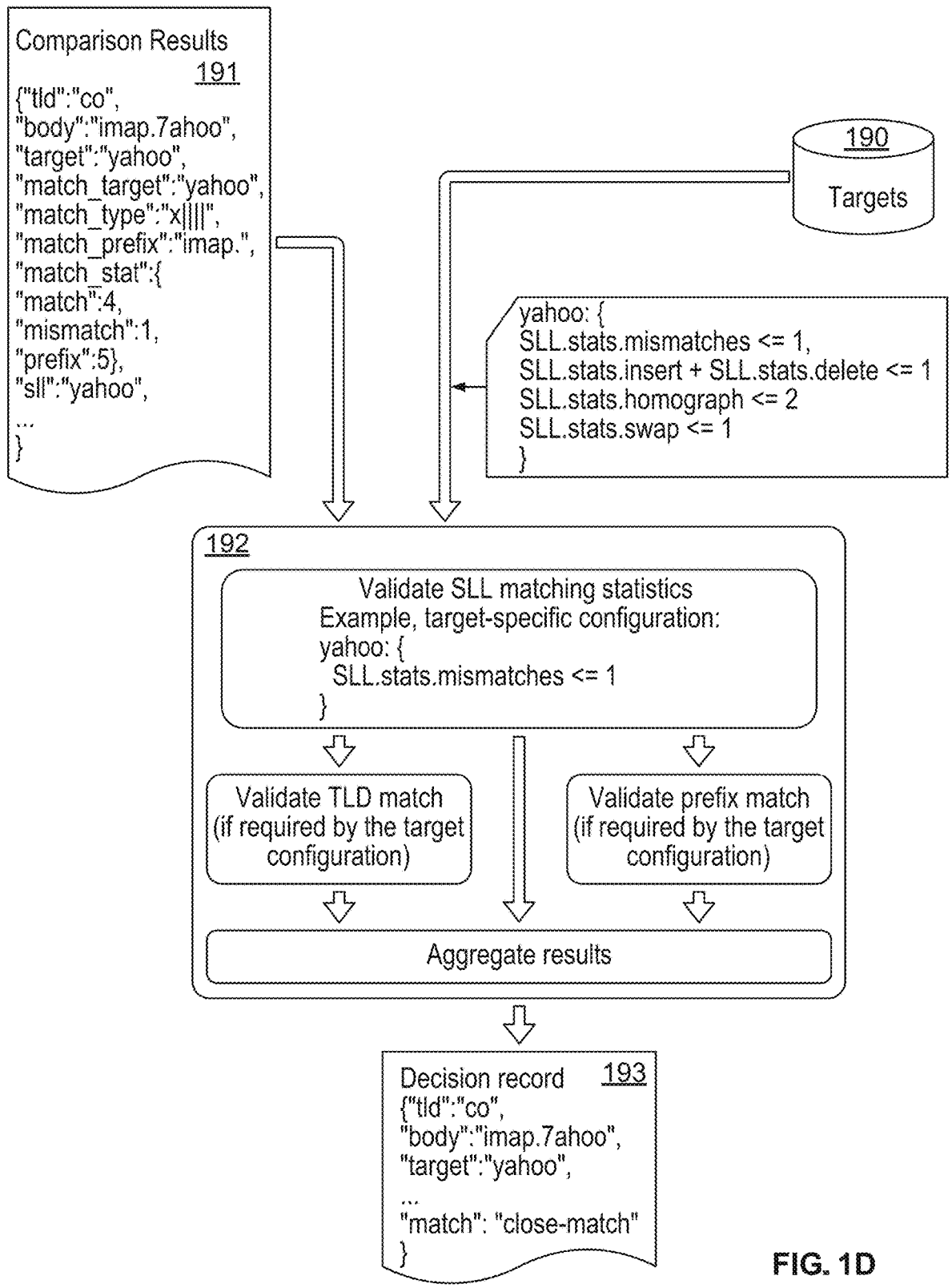
FIG. 1D illustrates a decision classifier of the system for detecting visual similarity between DNS FQDNs in accordance with some embodiments.

The classifier 132 may be implemented in a several ways. The decision classifier receives results of a visual comparison (e.g., 191 as shown in FIG. 1D) of the observed FQDN and associated target FQDN in the form of segmented FQDN parts corresponding to SLL match, TLD match, and Prefix match, and summary statistics associated with each of these components. A simple but efficient form of classifier includes target-specific boundary values for each type of matching, along with words list excluded from combosquatting comparison. An example of such a decision classifier implementation in accordance with some embodiments is illustrated in FIG. 1D.

The classifier retrieves the target configuration from Targets 190. In general, different targets require separate models. For example, target FQDN apple.com model may explicitly exclude all fruit-related words from combosquatting variants, such as "sweet", "crisp", "green", etc. The same configuration makes no sense in association with, for example paypal.com.

An example of model 192 that may be applied to matching results is a set of inequalities that a positive result needs to satisfy, as shown in the FIG. 1D. This configuration may refer to any artifacts detected in matching process, such as total number or homographs, total number of character swaps, maximal allowed length of prefix and suffix, requirement for visual separators on boundaries of matching, etc.

The classifier applies model 192 for each comparison results (e.g., prefix, SLL, TLD) and combines all these results into a final decision as shown at a decision record 193. If the classifier marks the result as positive, then it can add an encoded summary of findings. The results of classification may be supplied to reports generator and data consumers, such as DNS security service (e.g., as shown at 112 of FIG. 1B), depending on a user policy (e.g., as shown at 116 of FIG. 1B).

Implementation of the classifier may be based on more complex techniques, such as decision trees, neural networks, or other approaches.

Report Generator

As also shown in FIG. 1B, online platform 110 includes a report generator 140 that provides reports in deterministic instruction sequence that are, for example, suitable for the visual-based and/or text-based explanation generator for the detected malware FQDN results detected based on such visual FQDN similarity with targets as further described herein.

The results of detection may be represented as a report explaining in graphical and text form why the domain was flagged as suspicious/potential malware and list additional information associated with both detected FQDN and target FQDN. Several examples of such reports (e.g., example reports providing human-friendly explanations of visual similarity between a detection result and the associated target) in accordance with some embodiments are shown in FIG. 1E. The visual component includes mutually aligned components of detected FQDN and the target FQDN, where matching components are shown in bold characters and match relation are shown between two FQDNs. Inserted, missing and otherwise not present in other FQDN characters are shown as blank. Additional enrichment information related to both domain names is provided.

DNS Security Service

As also shown in FIG. 1B, DNS security detection results determined using the online platform 110 can also be communicated to a mitigation engine 114. In some implementations, the mitigation engine can be implemented within or integrated with the online platform and/or as components of a DNS server and/or a DNS appliance. Mitigation engine 114 can determine and request various mitigation actions in response to the DNS security detection results based on a policy, such as a DNS security policy stored in a policy database 116. For example, mitigation engine 114 can configure a switch or router networking device 120 to filter (e.g., block or blacklist) a DNS query/request that was determined to be associated with a bad network domain (e.g., domain name/FQDN that was determined to be a malware FQDN of a target domain name) using online platform 110 including analyzer/classifier 132. In some implementations, mitigation actions in response to the DNS security detection results based on a policy, such as a DNS security policy stored in a policy database 116, can include sending a DNS sample associated with a potential malware FQDN of a target domain name to DNS security service 112.

As another example, mitigation engine 114 can communicate with a DNS firewall 118 to identify one or more determined bad domains that were determined to be associated with a bad network domain (e.g., domain name/FQDN that was determined to be a malware FQDN of a target domain name) using online platform 110 including analyzer/classifier 132. In some implementations, mitigation engine 114 communicates with a DNS firewall (e.g., or other firewall device) 118 using a data feed, such as a Response Policy Zone (RPZ) data feed, via a publish/subscribe connection protocol, and/or various other communication mechanisms. In one embodiment, an architecture for an online platform implementing a homograph domain name detector for network security is disclosed that supports multiple classifiers for performing DNS security. For example, common attributes can be efficiently extracted from a DNS data stream for using by two or more different classifiers for performing DNS security. Example classifiers include classifiers for homograph domain name detection, domain flux (fast flux) related activities, classifiers for DNS tunneling related activities, classifiers for domain generation algorithm (DGA) related activities, and/or other classifiers for performing DNS security. Example classifiers for visual FQDN detection will now be further described below.

In one embodiment, online platform 110 includes a classifier shown at 132 for providing an inline malware FQDN detection component. For example, if a client device (not shown) sends a DNS query (e.g., A/AAAA query) to a DNS server, and if not cached, then the DNS server policy forwards the DNS query to an upper recursion (not shown) and is provided in DNS stream 102 for security analysis performed using online platform 110 for detection of detecting visual similarity of FQDNs of target domain names. The DNS query is processed for security analysis using classifier 132 based on alignment results to determine if positive (i.e., this particular DNS query uses a domain name that is determined to be visually similar to a target domain/FQDN based on a threshold), then the DNS query is identified as a malware FQDN and sent to mitigation engine 114 to determine an action to be performed based on a rule/policy stored in policy database 116. As such, if the DNS query is resolved and detection is positive as determined using online platform 110 including classifier 132 based on the alignment results (e.g., domains which resolve at the DNS server are checked against the classifier implemented by online platform 110 including classifier 132 based on the alignment results to predict if they are malicious as similarly described above, in which the domain name can be predicted to be a malicious visually similar FQDN of a target domain name by the classifier shown at 132 implemented by online platform 110 using the disclosed techniques for detection of visually similar DNS FQDNs, such as similarly described above and further described below), then an action can be performed based on a rule/policy stored in policy database 116 (e.g., adding the resolved IP address to a blacklist enforced using a firewall/DNS firewall, in which DNS firewall 118 can be implemented as a distinct product/service, such as a security server/appliance and/or security service, a component of the DNS server/appliance, and/or combinations thereof).

FIG. 3 illustrates examples of various lookalike domains that can be detected using the disclosed techniques in accordance with some embodiments. For example, the disclosed lookalike detection system monitors several hundreds of the most popular and most commonly attacked domains. The various lookalike domains that can be detected using the disclosed techniques for such domains can number in the order of tens of thousands of lookalike FQDNs per day (unique within a 30-day period), such as shown in FIG. 3.

Additional example processes for the disclosed techniques for detecting homographs of domain names will now be described.

Example Process Embodiments for Detecting Visual Similarity Between DNS Fully Qualified Domain Names FIG. 4 is a flow diagram illustrating a process for detecting visual similarity between DNS FQDNs in accordance with some embodiments. In various embodiments, process 400 is performed by the systems and processes described above with respect to FIGS. 1A-3.

At 402, a DNS data stream is received. For example, the DNS data stream can include a DNS query and a DNS response for resolution of the DNS query.

At 404, applying an extended sequence alignment for each of the set of FQDNs to identify potential malware FQDNs for one or more target FQDNs based on a visual similarity for each domain in the DNS data stream is performed. For example, various techniques are disclosed for applying an extended sequence alignment for each of the set of FQDNs to identify potential malware FQDNs for one or more target FQDNs based on a visual similarity for each domain in the DNS data stream such as similarly described above.

At 406, classifying the set of domains as malware FQDNs or benign FQDNs based on results of the extended sequence alignment is performed. For example, various techniques are disclosed for classifying the set of domains as malware FQDNs or benign FQDNs based on results of the extended sequence alignment, such as similarly described above.

FIG. 5 is another flow diagram illustrating a process for detecting visual similarity between DNS FQDNs in accordance with some embodiments. In various embodiments, process 500 is performed by the systems and processes described above with respect to FIGS. 1A-3.

At 502, a DNS data stream is received. For example, the DNS data stream can include a DNS query and a DNS response for resolution of the DNS query.

At 504, applying an extended sequence alignment for each of the set of FQDNs to identify potential malware FQDNs for one or more target FQDNs based on a visual similarity for each domain in the DNS data stream is performed. For example, various techniques are disclosed for applying an extended sequence alignment for each of the set of FQDNs to identify potential malware FQDNs for one or more target FQDNs based on a visual similarity for each domain in the DNS data stream such as similarly described above.

At 506, classifying the set of domains as malware FQDNs or benign FQDNs based on results of the extended sequence alignment is performed. For example, various techniques are disclosed for classifying the set of domains as malware FQDNs or benign FQDNs based on results of the extended sequence alignment, such as similarly described above.

At 508, a mitigation action is performed based on detecting the homograph of the domain name. For example, the mitigation action can include a configuration action and/or a filtering action (e.g., block or drop packets to/from the bad/malware network domain and/or bad/malware IP address associated with the potentially malicious network domain). As another example, the mitigation action can include configuring a network device (e.g., a switch or router, implemented as a physical or virtual switch/router) to quarantine the infected host and/or block access to the bad network domain and/or bad IP address associated with the homograph of the domain name, using network access control or other mechanisms to quarantine the infected host and/or block access to the bad network domain and/or bad IP address, configuring a security device controller using Open Flow techniques to configure a network device (e.g., a switch or router, implemented as a physical or virtual switch/router) to quarantine the infected host and/or block access to the bad network domain and/or bad IP address, and/or to implement other configuration/programming techniques such as via API or publish/subscribe mechanisms to configure a network device (e.g., a switch or router, implemented as a physical or virtual switch/router) to quarantine the infected host and/or block access to the bad network domain and/or bad IP address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled to the processor and configured to provide the processor with instructions when executed by the processor cause the processor to:
receive a DNS data stream, wherein the DNS data stream includes a DNS query and a DNS response for resolution of the DNS query, and wherein the DNS data stream includes a set of fully qualified domain names (FQDNs);
prefilter the set of FQDNs for identifying potential malware FQDNs for one or more target FQDNs;
perform extended sequence alignment for each of the set of FQDNs to identify the potential malware FQDNs for the one or more target FQDNs based on a visual similarity for each domain in the DNS data stream, comprising to:
receive a candidate FQDN of the each of the set of FQDNs and a target FQDN of the one or more target FQDNs;
construct a cost table and an operations table, wherein the cost table includes minimal costs for all incremental comparison of the candidate FQDN and the target FQDN, and wherein in each cell, the operations table stores encoding of a minimal cost operation that is allowed to reach a position; and
determine a set of operations to transform the target FQDN into the candidate FQDN based on the cost table and the operations table, wherein the set of operations is associated with a minimal cost;
classify the set of FQDNs as malware FQDNs or benign FQDNs based on results of the extended sequence alignment; and
perform a mitigation action based on a detection of the malware FQDNs.

2. The system recited in claim 1, wherein the DNS data stream is a live DNS data stream.

3. The system recited in claim 1, wherein one or more of the malware FQDNs are homographic lookalikes of one or more target domain names, combosquatting lookalikes of one or more target domains, embedding lookalikes of the one or more target domains, or any combinations thereof.

4. The system recited in claim 1, wherein to perform the extended sequence alignment for each of the set of FQDNs to identify the potential malware FQDNs for the one or more target FQDNs based on the visual similarity for each domain in the DNS data stream further includes recovering a set of operations to transform a selected target FQDN of the one or more target FQDNs into an observed FQDN.

5. The system recited in claim 1, wherein to perform the extended sequence alignment for each of the set of FQDNs to identify the potential malware FQDNs for the one or more target FQDNs based on the visual similarity for each domain in the DNS data stream further includes recovering a set of operations to transform a selected target FQDN of the one or more target FQDNs into an observed FQDN, where the set of operations includes one or more of following operations: match characters and mismatch characters.

6. The system recited in claim 1, wherein to perform the extended sequence alignment for each of the set of FQDNs to identify the potential malware FQDNs for the one or more target FQDNs based on the visual similarity for each domain in the DNS data stream further includes recovering a set of operations to transform a selected target FQDN of the one or more target FQDNs into an observed FQDN, where the set of operations includes one or more of following operations: insert character and delete character.

7. The system recited in claim 1, wherein to perform the extended sequence alignment for each of the set of FQDNs to identify the potential malware FQDNs for the one or more target FQDNs based on the visual similarity for each domain in the DNS data stream further includes recovering a set of operations to transform a selected target FQDN of the one or more target FQDNs into an observed FQDN, where the set of operations includes one or more of following operations: swap characters, homograph, and composite homograph.

8. The system recited in claim 1, wherein the processor is further configured to:
generate a report in a deterministic instruction sequence including a text-based and/or visual-based explanation for each of the malware FQDNs.

9. The system recited in claim 1, wherein the processor is further configured to:
block the DNS response to impede a client communication with an IP address associated with the malware FQDNs.

10. The system recited in claim 1, wherein the DNS response for resolution of the DNS query includes an IP address, and wherein the processor is further configured to:
add the IP address associated with the malware FQDNs to a blacklist or to a blacklist feed.

11. The system recited in claim 1, wherein the DNS response for resolution of the DNS query includes an IP address, and wherein the processor is further configured to:
send the IP address associated with the malware FQDNs to a firewall.

12. The system recited in claim 1, wherein the processor is further configured to perform one or more mitigation actions comprising to:
generate a firewall rule based on an IP address associated with a first malware FQDN;
configure a network device to block network communications with the IP address associated with the first malware FQDN;
quarantine an infected host, wherein the infected host is determined to be infected based on an association with the IP address associated with the first malware FQDN; and
add the first malware FQDN to a reputation feed.

13. A method, comprising:
receiving a DNS data stream, wherein the DNS data stream includes a DNS query and a DNS response for resolution of the DNS query, and wherein the DNS data stream includes a set of fully qualified domain names (FQDNs);
prefiltering the set of FQDNs for identifying potential malware FQDNs for one or more target FQDNs;
performing extended sequence alignment for each of the set of FQDNs to identify the potential malware FQDNs for the one or more target FQDNs based on a visual similarity for each domain in the DNS data stream, comprising:

receiving a candidate FQDN of the each of the set of
   FQDNs and a target FQDN of the one or more target
   FQDNs;
  constructing a cost table and an operations table,
     wherein the cost table includes minimal costs for all
     incremental comparison of the candidate FQDN and
     the target FQDN, and wherein in each cell, the
     operations table stores encoding of a minimal cost
     operation that is allowed to reach a position;
  determining a set of operations to transform the target
     FQDN into the candidate FQDN based on the cost
     table and the operations table, wherein the set of
     operations is associated with a minimal cost;
  classifying the set of FQDNs as malware FQDNs or
     benign FQDNs based on results of the extended
     sequence alignment; and
 performing a mitigation action based on a detection of the
   malware FQDNs.

14. The method of claim 13, wherein one or more of the malware FQDNs are homographic lookalikes of one or more target domain names, combosquatting lookalikes of one or more target domains, embedding lookalikes of one or more target domains, or any combinations thereof.

15. The method of claim 13, wherein performing the extended sequence alignment for each of the set of FQDNs to identify the potential malware FQDNs for the one or more target FQDNs based on the visual similarity for each domain in the DNS data stream further includes recovering a set of operations to transform a selected target FQDN of the one or more target FQDNs into an observed FQDN.

16. The method of claim 13, further comprising:
 generating a report in a deterministic instruction sequence including a text-based and/or visual-based explanation for each of the malware FQDNs.

17. A computer program product embodied in a non-transitory computer readable medium and comprising computer instructions for:
 receiving a DNS data stream, wherein the DNS data stream includes a DNS query and a DNS response for resolution of the DNS query, and wherein the DNS data stream includes a set of fully qualified domain names (FQDNs);
 prefiltering the set of FQDNs for identifying potential malware FQDNs for one or more target FQDNs;
 performing extended sequence alignment for each of the set of FQDNs to identify the potential malware FQDNs for the one or more target FQDNs based on a visual similarity for each domain in the DNS data stream, comprising:
   receiving a candidate FQDN of the each of the set of FQDNs and a target FQDN of the one or more target FQDNs;
   constructing a cost table and an operations table, wherein the cost table includes minimal costs for all incremental comparison of the candidate FQDN and the target FQDN, and wherein in each cell, the operations table stores encoding of a minimal cost operation that is allowed to reach a position;
   determining a set of operations to transform the target FQDN into the candidate FQDN based on the cost table and the operations table, wherein the set of operations is associated with a minimal cost;
  classifying the set of FQDNs as malware FQDNs or benign FQDNs based on results of the extended sequence alignment; and
 performing a mitigation action based on a detection of the malware FQDNs.

* * * * *